(12) United States Patent
Bishel

(10) Patent No.: US 8,275,506 B1
(45) Date of Patent: Sep. 25, 2012

(54) BOUNDARY SENSOR

(76) Inventor: Richard Anthony Bishel, Beaverton, OR (US)

( * ) Notice: Subject to any disclaimer, the term of this patent is extended or adjusted under 35 U.S.C. 154(b) by 608 days.

(21) Appl. No.: 12/455,846

(22) Filed: Jun. 8, 2009

Related U.S. Application Data

(60) Provisional application No. 61/131,440, filed on Jun. 8, 2008.

(51) Int. Cl.
*G05D 1/00* (2006.01)
(52) U.S. Cl. ......................................................... 701/25
(58) Field of Classification Search ....................... 701/25
See application file for complete search history.

(56) References Cited

U.S. PATENT DOCUMENTS

| | | |
|---|---|---|
| 3,425,197 A | 2/1969 | Kita |
| 3,550,714 A | 12/1970 | Bellinger |
| 3,570,227 A | 3/1971 | Bellinger |
| 3,650,097 A | 3/1972 | Nokes |
| 3,789,939 A | 2/1974 | Geislinger |
| 3,924,389 A | 12/1975 | Kita |
| 4,133,404 A | 1/1979 | Griffin |
| 4,180,964 A | 1/1980 | Pansire |
| 4,184,559 A | 1/1980 | Rass |
| 4,211,921 A | 7/1980 | Kanetou et al. |
| 4,318,266 A | 3/1982 | Taube |
| 4,472,716 A | 9/1984 | Hansen |
| 4,482,960 A | 11/1984 | Pryor |
| 4,500,970 A | 2/1985 | Daemmer |
| 4,545,453 A | 10/1985 | Yoshimura et al. |
| 4,573,547 A | 3/1986 | Yoshimura et al. |
| 4,603,753 A | 8/1986 | Yoshimura et al. |
| 4,638,445 A | 1/1987 | Mattaboni |
| 4,694,639 A | 9/1987 | Chen et al. |
| 4,777,785 A | 10/1988 | Rafaels |
| 4,831,813 A | 5/1989 | Jona et al. |
| 4,868,752 A | 9/1989 | Fujii et al. |
| 4,887,415 A | 12/1989 | Martin |
| 4,893,025 A | 1/1990 | Lee |
| 4,962,453 A | 10/1990 | Pong et al. |
| 5,007,234 A | 4/1991 | Shurman et al. |
| 5,155,775 A | 10/1992 | Brown |
| 5,163,273 A | 11/1992 | Wojtkowski et al. |
| 5,170,352 A | 12/1992 | McTamaney et al. |
| 5,189,612 A | 2/1993 | Lemercier et al. |
| 5,196,689 A | 3/1993 | Suqita et al. |
| 5,204,814 A | 4/1993 | Noonan et al. |
| 5,279,068 A | 1/1994 | Rees et al. |
| 5,351,778 A | 10/1994 | Shigemi et al. |
| 5,444,965 A | 8/1995 | Colens |
| 5,507,137 A | 4/1996 | Norris |
| 5,525,882 A | 6/1996 | Asaka et al. |
| 5,528,888 A | 6/1996 | Miyamoto et al. |
| 5,803,334 A | 9/1998 | Patel et al. |
| 5,911,670 A | 6/1999 | Angott et al. |
| 5,956,250 A | 9/1999 | Gudat et al. |
| 5,974,347 A | 10/1999 | Nelson |
| 6,055,041 A | 4/2000 | Matsumoto et al. |
| 6,095,254 A | 8/2000 | Hamburg |
| 6,255,793 B1 | 7/2001 | Peless et al. |
| 6,321,515 B1 | 11/2001 | Colens |
| 6,323,948 B2 | 11/2001 | Haque et al. |

(Continued)

*Primary Examiner* — Eric Culbreth

(57) ABSTRACT

A sensor that detects the boundary between a first, relatively higher surface, such as the un-mowed vegetation and a second, a relatively lower surface, such as the mowed vegetation, and a controller for steering the semi-autonomous or autonomous vehicle along detected boundary. The boundary between the two surfaces is detected using a plurality of non-contact distance measuring sensors aligned in same direction, and processes these distance measuring sensors for determining the distance sensors that measure said first relatively higher surface and the distance sensors that measure the second relatively lower surface.

14 Claims, 27 Drawing Sheets

U.S. PATENT DOCUMENTS

| | | |
|---|---|---|
| 6,417,641 B2 | 7/2002 | Peless et al. |
| 6,493,613 B2 | 12/2002 | Peless et al. |
| 6,727,511 B2 | 4/2004 | Cusick et al. |
| 6,850,024 B2 | 2/2005 | Peless et al. |
| 7,103,457 B2 | 9/2006 | Dean |
| 7,117,660 B1 | 10/2006 | Colens |
| 7,119,887 B2 | 10/2006 | Mizuo et al. |
| 7,155,309 B2 | 12/2006 | Peless et al. |
| 7,362,439 B2 | 4/2008 | Franzen et al. |
| 2006/0059880 A1 | 3/2006 | Angott |
| 2008/0039974 A1 | 2/2008 | Sandin et al. |

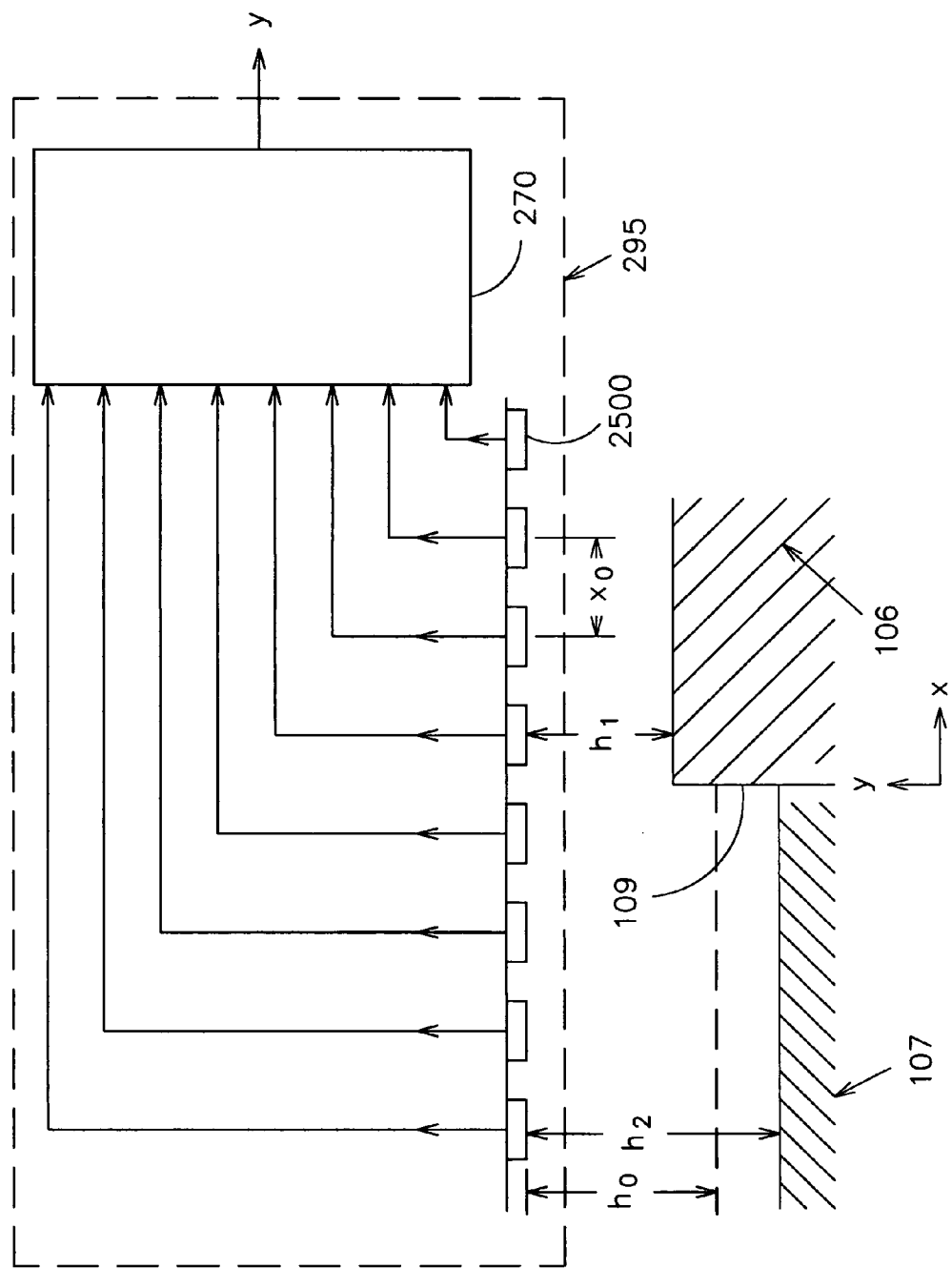

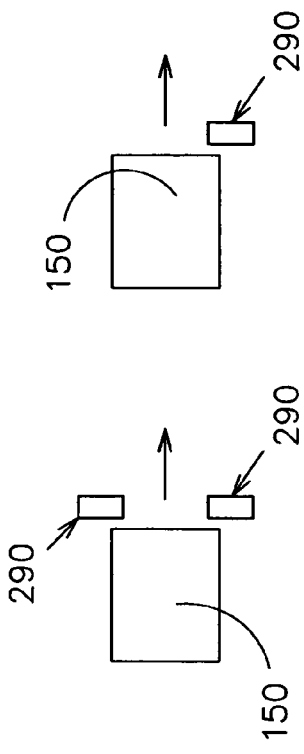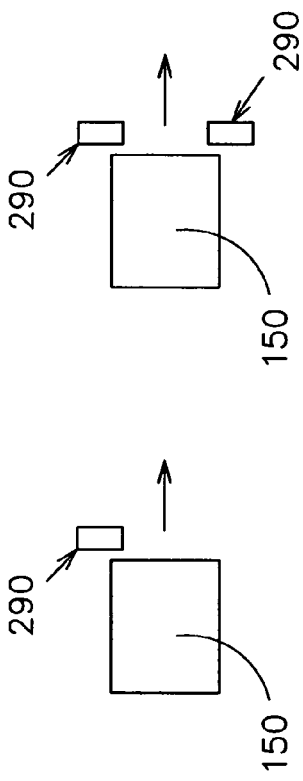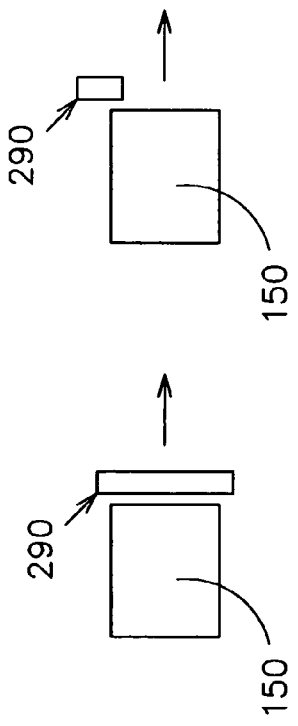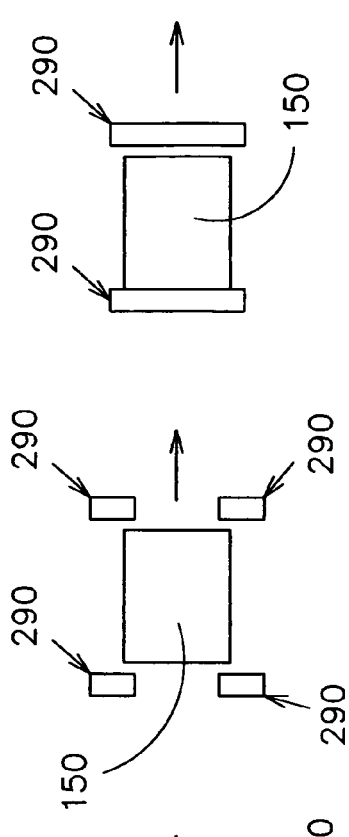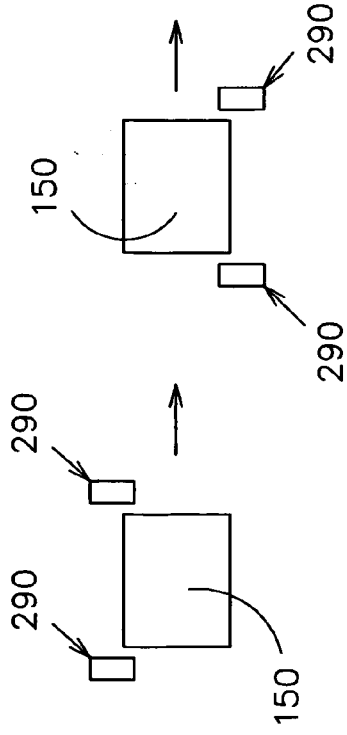

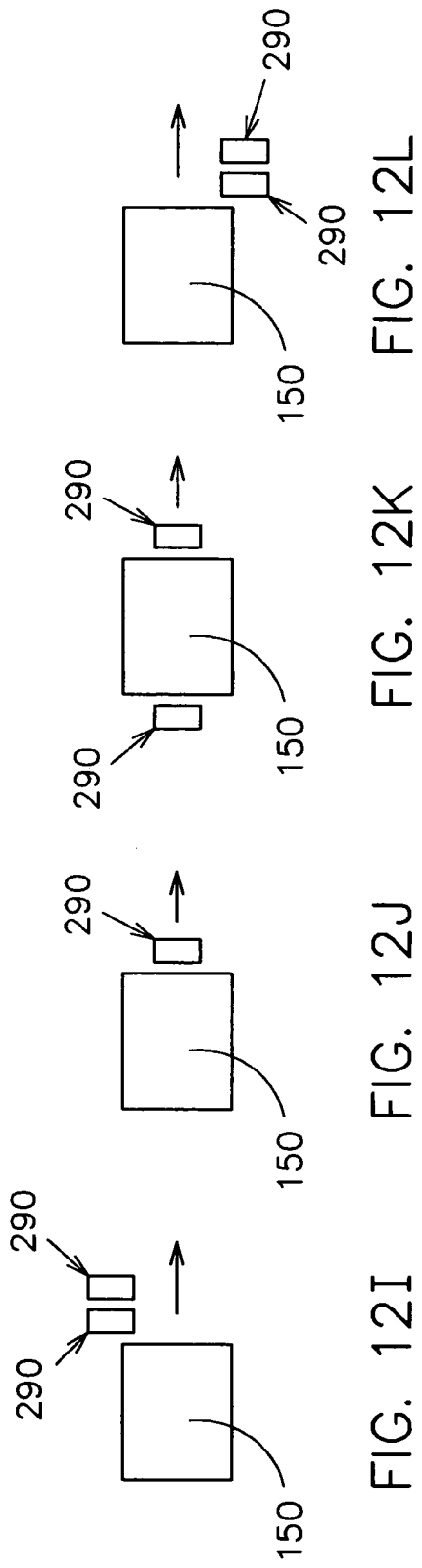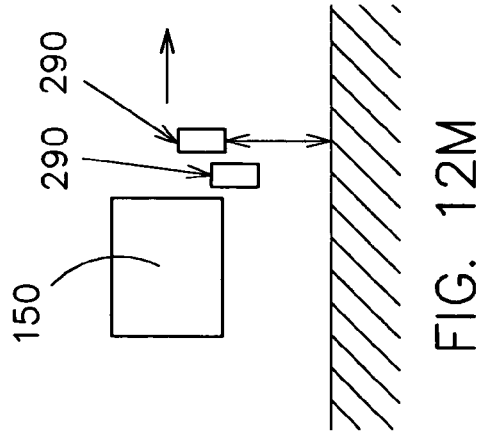

BOUNDARY SENSOR

RELATED APPLICATIONS

The patent application claims priority of Provisional Application No. 61/131,440, filed on Jun. 8, 2008.

FIELD OF INVENTION

The present invention relates to an apparatus and a system for guiding or controlling a semi-autonomous or autonomous vehicle.

BACKGROUND

Robotic vehicles, autonomous lawn mowers, and self-propelled vehicles are currently available and are known in prior art. The current commercially available autonomous lawn mowers made by companies such as Belrobotics, Friendly Robotics, and Kyoda America use a continuous guide conductor boundary around the confined area. The autonomous lawn mowers randomly mowed around the confined area. This art is described in early patents such as U.S. Pat. Nos. 3,550,714 and 3,570,227 by Bellinger. More recently, Peless et al. U.S. Pat. Nos. 6,255,793 B1, 6,417,641 B2, 6,850,024 B2, and 7,155,309 B2 discusses this technology. These autonomous lawn mowers take time to mow the entire area completely and may miss certain sections of the lawn every operation. They require installation, excitation, and maintenance of conductor around the desired area. Also, Colens U.S. Pat. No. 6,321,515 B1 discloses a similar system where the buried wire restricts the mower to operate randomly within a certain area.

Some autonomous vehicles use a pre-programmed or pre-recorded path for guidance such as Nokes U.S. Pat. No. 3,650,097, Geslinger U.S. Pat. No. 3,789,939, and Noonan et al. U.S. Pat. No. 5,204,814. These systems are unsatisfactory because of tire slippage, etc. Some RTK GPS-based systems have been developed and are outline in U.S. Pat. No. 5,956,250 by Gudat et al. These are very expensive systems and require open space areas. Trees blocking the signals may cause concerns.

Tracking the cut/uncut vegetation border has also been tried by various inventors. U.S. Pat. Nos. 3,425,197 and 3,924,387, both to Kita, uses electrical conductors touching the uncut grass. Martin U.S. Pat. No. 4,887,415 uses touch grass detection switches on the rear of the mower frame to provide an indication of the relative position of the cut/uncut grass boundary. The vehicle needs to be moving for the touch sensor to detect the boundary. U.S. Pat. No. 5,528,888 by Miyamoto et al. describes a plurality of mechanical rocking members to detect the cut/uncut boundary. The vehicle also requires to be moving in order to determine the boundary. Likewise, U.S. Pat. No. 6,255,793 B1 by Peless et al. discloses using mechanical plates attached to potentiometers spaced far apart to determine an estimated boundary. Similarly as Miyamoto et al., the autonomous vehicle needs to be moving in order to determine the boundary.

An optical tracking system to detect the cut/uncut grass boundary is described in Griffin U.S. Pat. No. 4,133,404. Griffin shows a fluorescent light source directed at the grass and the reflection from the grass is detected by a plurality of optical sensors. These optical sensors measure the intensity of the light after it has been reflected by the grass. The position of the cut/uncut grass boundary is determined by measuring a different reflected light intensity for the cut grass than for the uncut grass. However, if the light intensity differential between the cut and uncut grass is not significantly, the system does not work well. Yoshimura et al. U.S. Pat. No. 4,573,547 describes a system that uses photosensors to detect cut/uncut boundary by the presence or absence of the grass. Since the width of the grass blade is small, the optical sensor does not reliably detect the cross sectional grass blade and the cut/uncut boundary. To overcome this limitation, the photosensor is integrated with an orientation sensor. U.S. Pat. No. 4,777,785 from Rafaels discusses a plurality of optical sensors to detect the presence or absence of grass. Like the Yoshimura et al. patent, since the width of grass blade is small, the optical sensor does not reliably detect the cross sectional grass blade and the cut/uncut boundary. The patent description describes ways of improving the situation. Also, the system requires a reference path to be mowed prior to start of process.

The prior art does not reliably detect the boundary between the cut/uncut vegetation or provide a reasonable cost system for controlling a robotic vehicle.

SUMMARY OF INVENTION

It is therefore a general object of the invention to overcome the disadvantages of the prior art form for detecting a boundary between a first, relatively higher surface, such as un-mowed vegetation, and a second, a relatively lower surface, such as mowed vegetation. In addition to detecting the boundary, it is further object of this invention to guide or control a semi-autonomous or autonomous vehicle along the detected boundary.

Another object of the invention is a boundary sensor that detects the boundary between the two surfaces uses a plurality of non-contact distance measuring sensors aligned in same direction and processes the number of distance measuring sensors that measure the first relatively higher surface versus the number of the distance measuring sensors that measure the second relatively lower surface to determine the boundary.

Another object of the invention is a guidance apparatus for a robotic vehicle where the guidance apparatus detects the boundary between a first, relatively higher surface, such as the un-mowed vegetation and a second, a relatively lower surface, such as the mowed vegetation, and provides control signals to steer the robotic vehicle along detected boundary.

Another object of the invention is a guidance apparatus for a robotic vehicle where the guidance apparatus detects the boundary between a first, relatively higher surface, such as the un-mowed vegetation and a second, a relatively lower surface, such as the mowed vegetation, determines the location of the vehicle via a navigational sensor/s, and provides control signals to steer the robotic vehicle along the detected or virtual boundary.

LIST OF FIGURES

FIG. 9 is a front view of the boundary sensor following a boundary between different flat surface heights such as a curb or sidewalk;

FIG. 12A is a top view of a vehicle with the boundary sensor mounted on the front of the vehicle;

FIG. 12B is a top view of a vehicle with the boundary sensor mounted on the front left of the vehicle;

FIG. 12C is a top view of a vehicle with two boundary sensors mounted on the left and right sides in front of the vehicle;

FIG. 12D is a top view of a vehicle with the boundary sensor mounted on the front right of the vehicle;

FIG. 12E is a top view of a vehicle with two boundary sensors: one mounted on the front left of the vehicle and other mounted on the rear left;

FIG. 12F is a top view of a vehicle with two boundary sensors: one mounted on the front right of the vehicle and other mounted on the rear right;

FIG. 12G is a top view of a vehicle with four boundary sensors mounted on the corners of the vehicle;

FIG. 12H is a top view of a vehicle with two boundary sensors mounted on the front and rear of the vehicle;

FIG. 12I is a top view of a vehicle with two boundary sensors mounted on the front left of the vehicle;

FIG. 12J is a top view of a vehicle with the boundary sensor mounted on the front center of the vehicle;

FIG. 12K is a top view of a vehicle with two boundary sensors mounted on the front and rear center of the vehicle;

FIG. 12L is a top view of a vehicle with two boundary sensors mounted on the front right of the vehicle;

FIG. 12M is a side view of a vehicle with two boundary sensors mounted at different heights in front of the vehicle;

DESCRIPTION

Figure 1:
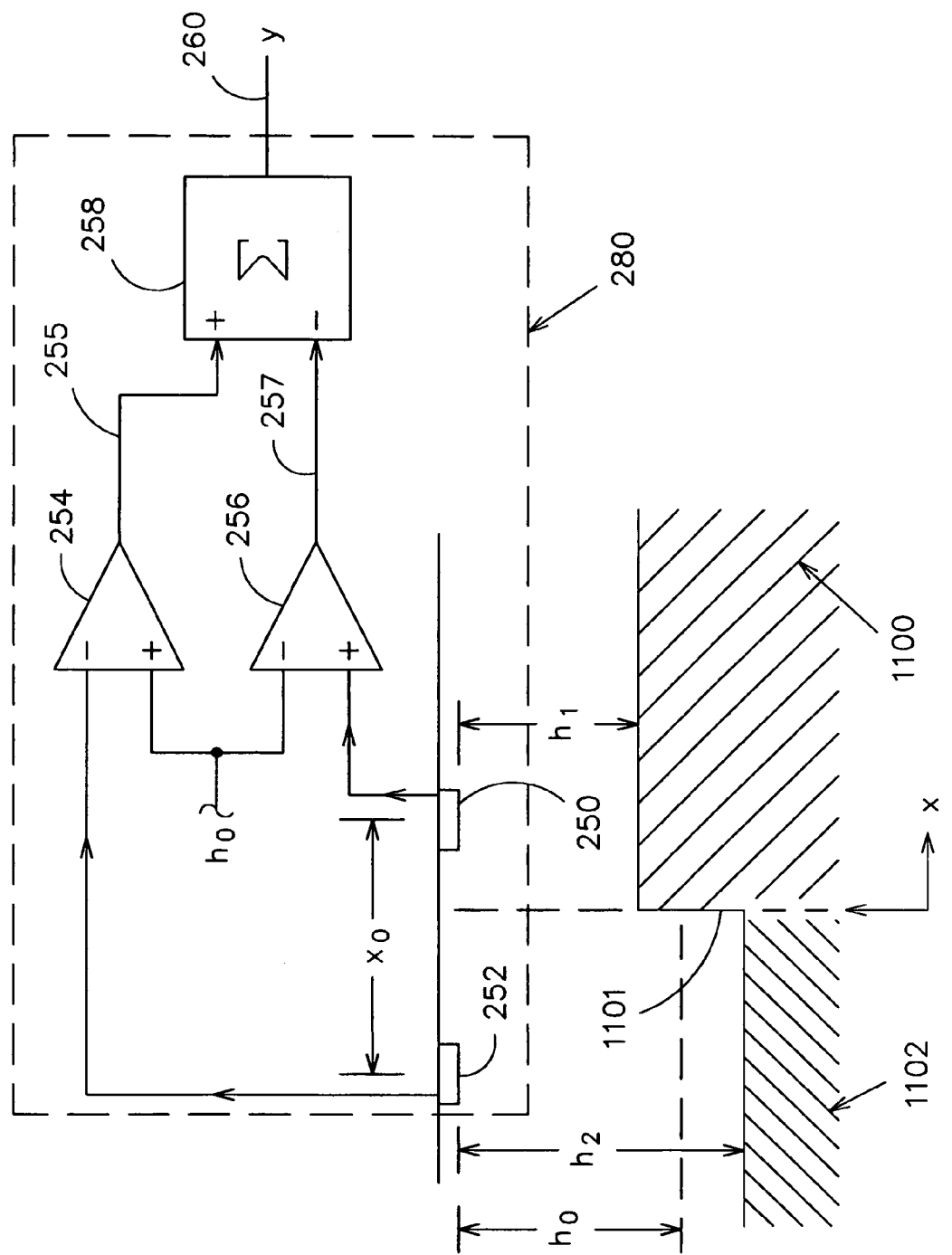
FIG. 1 is a front pictorial view of the boundary sensor with two distance measuring sensors.
Figure 2:
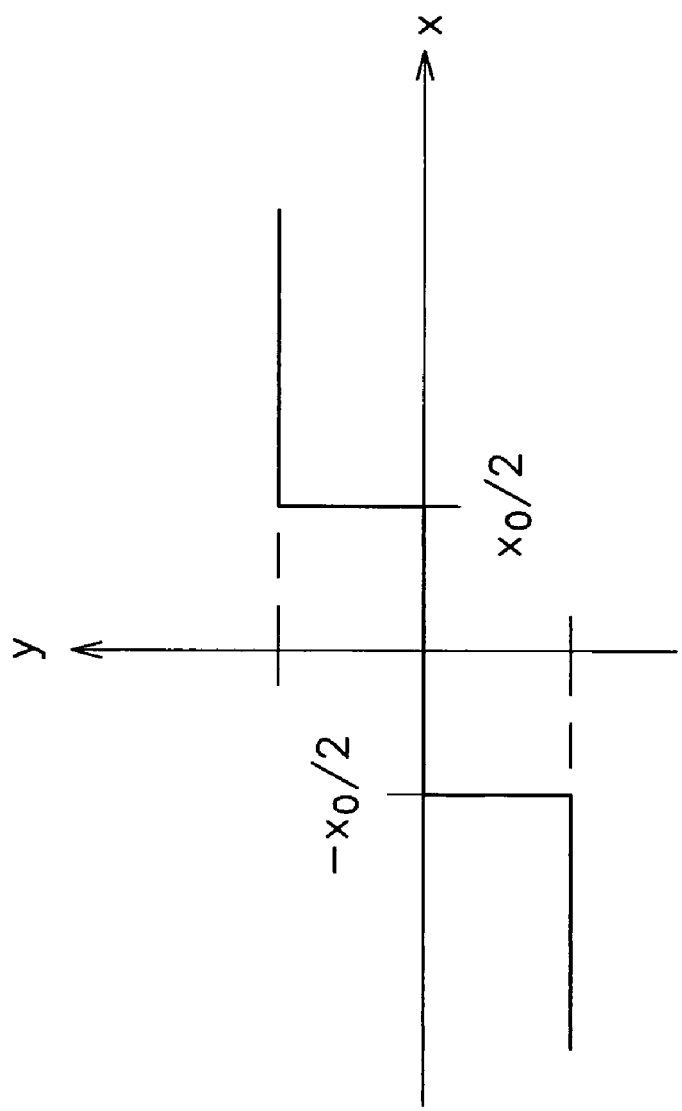
FIG. 2 is a graphical plot of the output of the embodiment in FIG. 1.

FIG. 1 shows a block diagram of preferred embodiment 280 of the invention. Sensors 250 and 252 are distance measuring sensors such as infrared distance sensors, ultrasonic distance sensors, microwave distance sensors, laser distance sensors, vision distance sensors, and other non-contact distance measuring sensors. Sensors 250 and 252 measure distance to the surfaces 1100 and 1102, respectively, Sensor 252 measures the distance h2 from the relatively lower plane defined by the detected surface 1102 and sensor 250 measures the distance h1 form the relatively higher plane or surface 1100. The distance measurements from the sensors 250 and 252 are compared to the distance h0 which is between the distances h2 and h1. Comparators 254 and 256 compare the distance measurements from the sensors to the distance h0. If sensor 252 measures h2, the output of the comparator 254 is a low signal level. If the sensor 250 measures h1, the output of comparator 256 is a low signal level. Subtracting output from comparator 256 from the output from the comparator 254 gives the output y, 260. Since both output signals are low, the output is zero. FIG. 2 shows the output y versus the distance x from the boundary 1101. The spacing x0 is the distance between the two sensors. If both sensors 250 and 252 are over the relatively higher surface 1100 and each measures h1, then the outputs of the comparator 254 would be a high signal level and the output of comparator 256 is a low signal level. Subtracting the high signal level with low level gives output 260 of a high positive level as shown in FIG. 2. Likewise, if both sensors 250 and 252 are measuring the relatively lower surface 1102, the sensors 250 and 252 would measure approximately distance h2. The output of the comparator 254 would be a low signal level, but now the output of the comparator 256 is a high signal level. Subtracting the high signal level from the low signal gives a high negative signal as shown in FIG. 2 when both sensors 250 and 252 are measuring the relatively lower surface 1102. The boundary 1101 is detected when sensor 252 is over the relatively lower surface 1102 and sensor 250 is over the relatively higher surface 1100. The spacing x0 between sensors 250 and 252 determine the spacing error in determining the boundary 1101 between the two relatively dissimilar surface levels.

Figure 3:
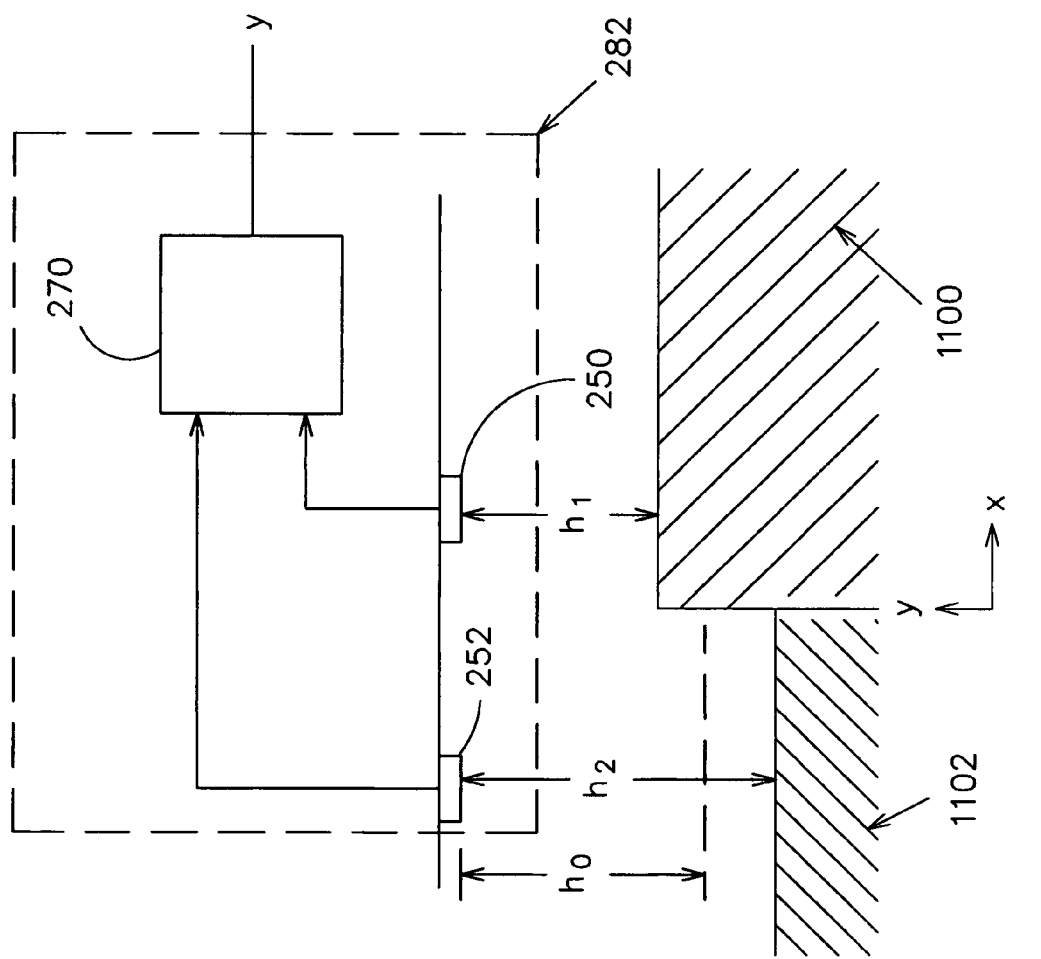
FIG. 3 is a front pictorial view of the boundary sensor with two distance measuring sensors and a microcontroller.

FIG. 3 shows another non-contact sensor assembly 282 which uses a microcontroller 270 instead of the digital and analog circuitry. The microcontroller 270 processes the two distance measurements h2 and h1 from sensors 252 and 250, respectively, and outputs y similarly to FIG. 2. The comparison distance h0 can be derived prior to operating the embodiment 282 and input to the microcontroller 270 as a parameter. The comparison distance h0 can be derived during the initialization phase by taking the average between h1 and h2. The comparison distance h0 can be continuously derived from taking ongoing measurements of the relatively higher surface and the relatively lower surface with sensors 250 and 252 or from a separate module.

Figure 4:
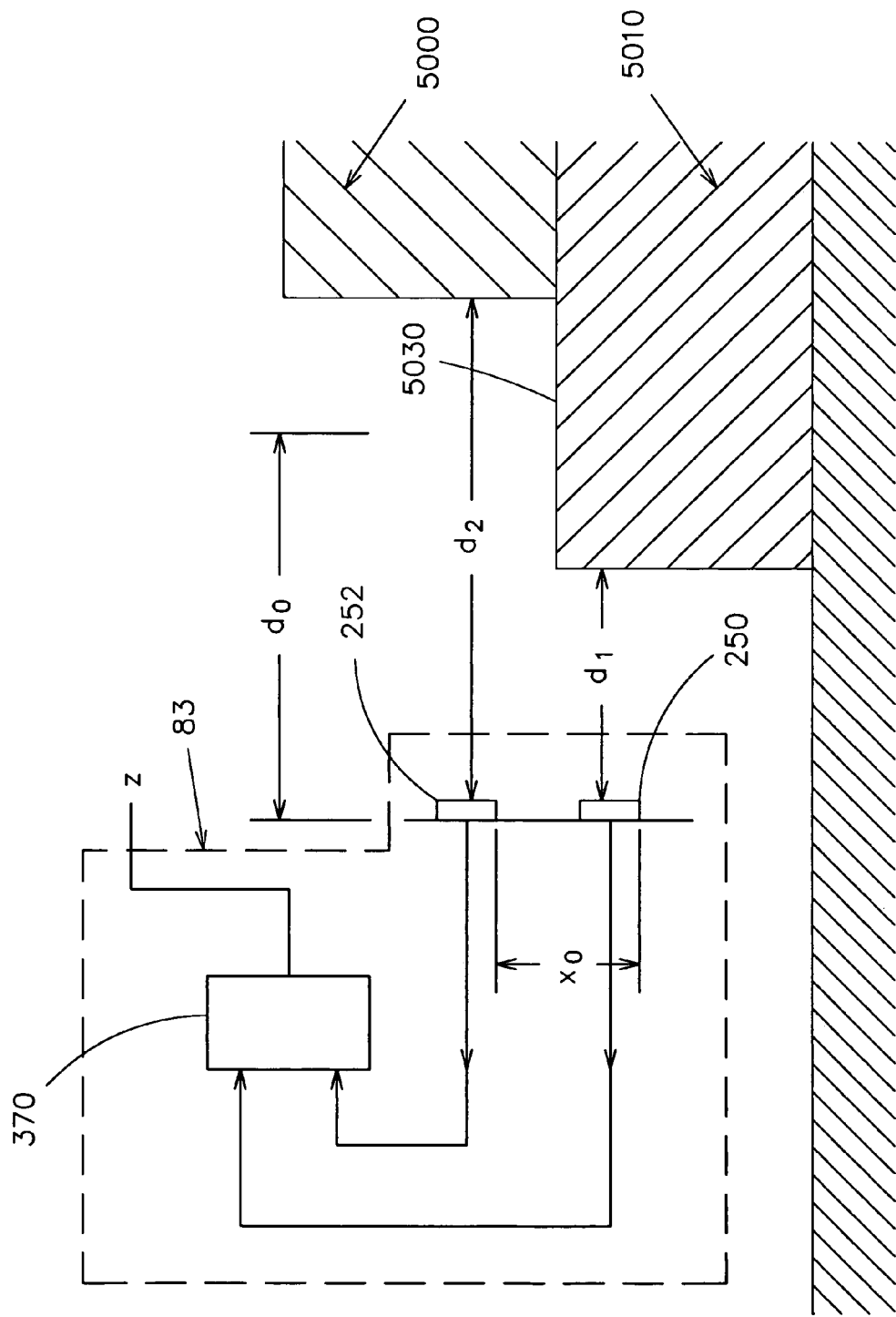
FIG. 4 is a front pictorial view of the boundary sensor with two distance measuring sensors viewing vertical surfaces.

FIG. 4 shows an embodiment 83 that detects a boundary on a wall or vertical surfaces, 5000 and 5010. Sensors 250 and 252 measure d1 and d2, respectively, and in a like manner as to detecting a boundary on a horizontal surface, embodiment 83 processes these measurements d1 and d2 via controller 370 and compares to a comparison distance d0. The output z would be similar to FIG. 2 except boundary 5030 would be detected.

Figure 5:
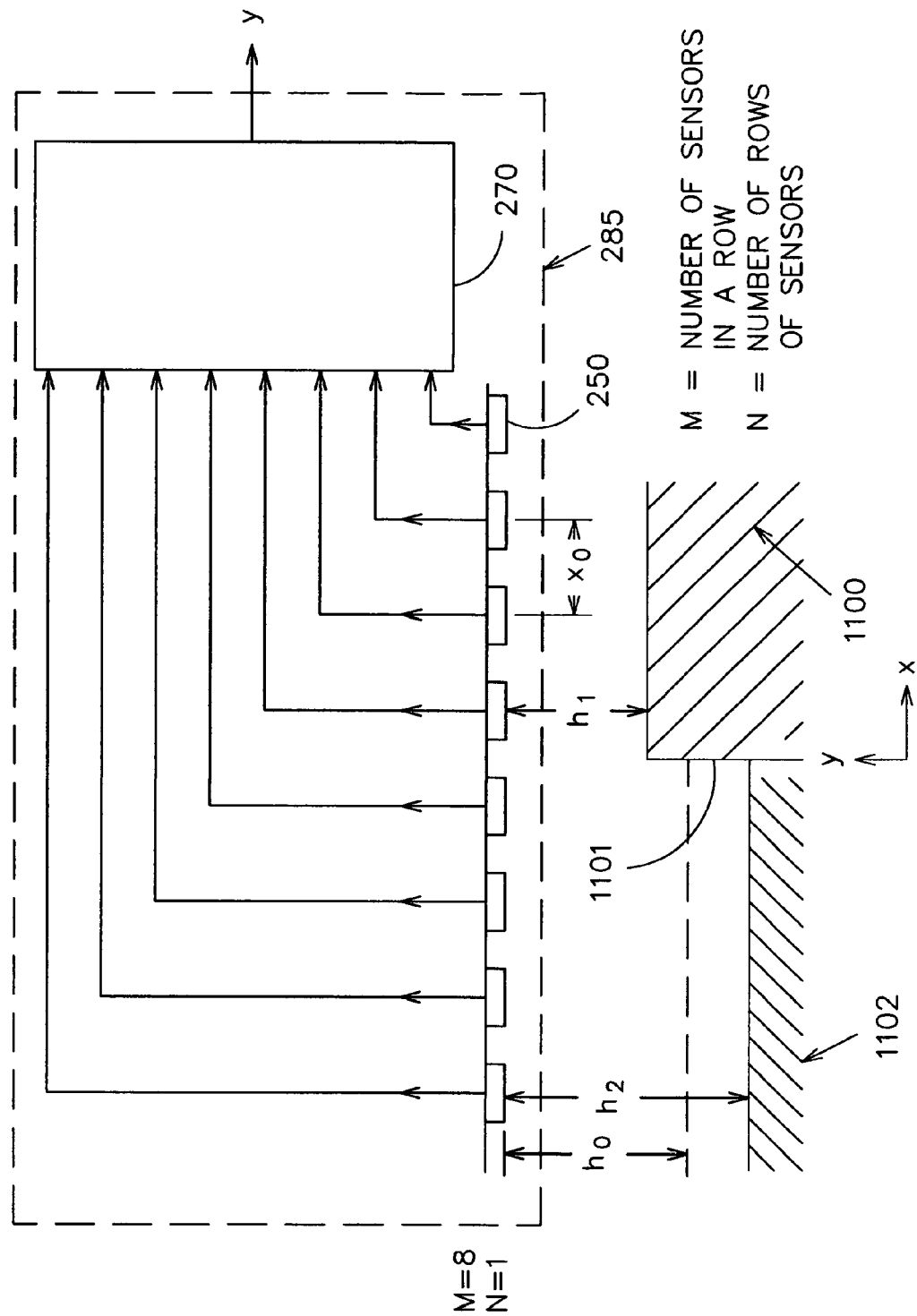
FIG. 5 is a front pictorial view of the boundary sensor with eight distance measuring sensors.
Figure 6:
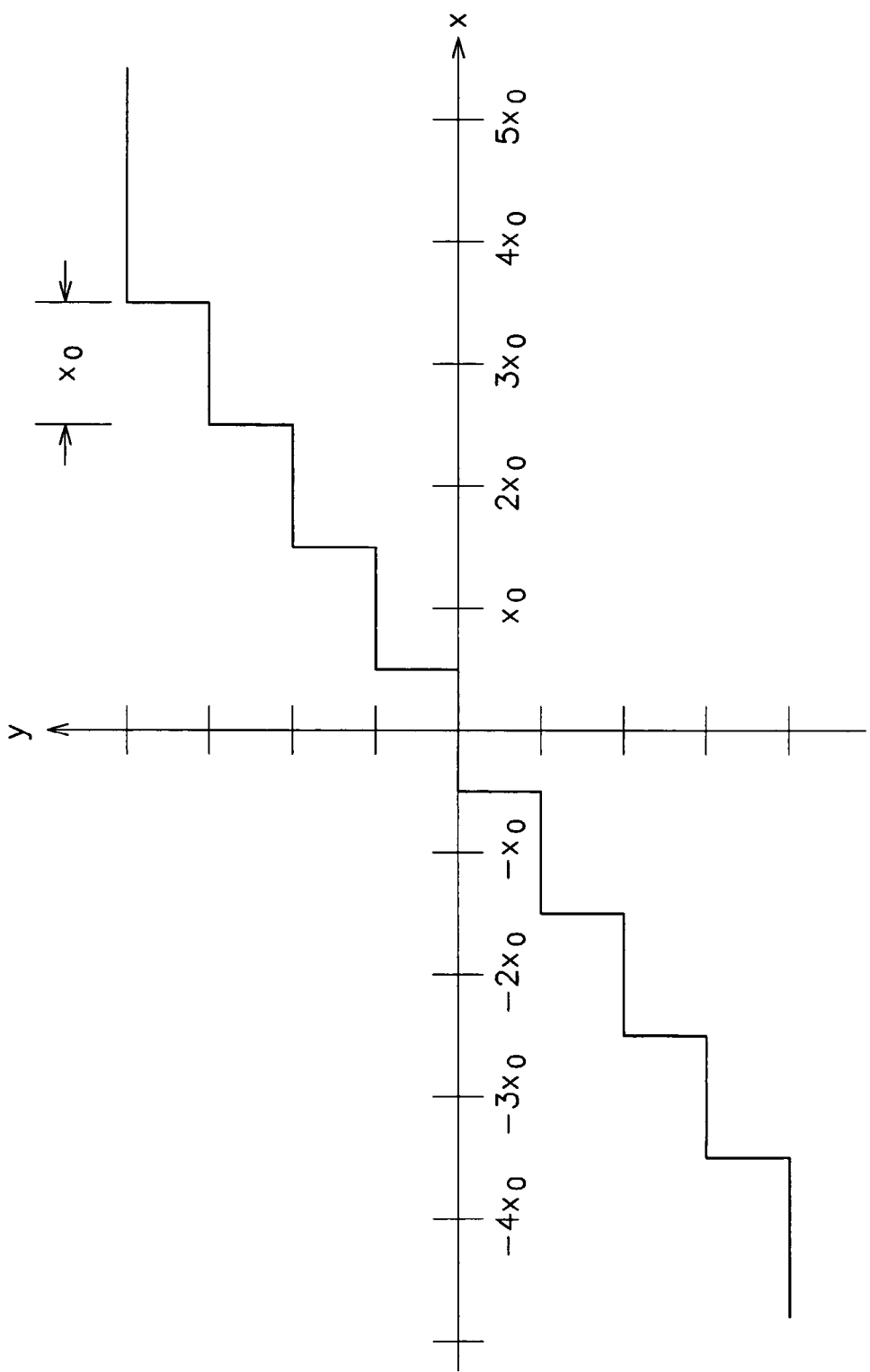
FIG. 6 is a graphical plot of the output of the embodiment in FIG. 5.

FIG. 5 shows an embodiment 285 with array of distance measuring sensors 250 spaced a distance x0 apart at the same horizontal level. Each sensor 250 measures either the relatively lower surface 1102 as a distance h2 or the relatively higher surface 1100 as a distance h1. When comparing the sensors 250 distance measurements with a comparison distance h0, an output y from the microcontroller 270 would be as illustrated in FIG. 6 where the detected boundary 1101 is centered in the middle of the sensor array. The output y could have the detected boundary 1101 set between any of the sensors 250 of the sensor array by an offset. As shown in FIG. 5, each time a sensor 250 crosses the boundary 1101, going from a relatively higher surface 1100 to a relatively lower surface 1102 or from relatively lower surface 1102 to a relatively higher surface, a step wise output occurs due to the change in comparing that sensor distance measurement with the comparison distance h0. If the sensors 250 are equally spaced, a linear step wise output y occurs from the embodiment 285 as illustrated in FIG. 6. The sensors can be spaced at various distances from each other. Sensors can be spaced very closely where the detected boundary 1101 is located and farther apart when further from the detected boundary 1101. This would be useful in providing guidance signals to autonomous vehicles, where the needed accuracy is near the detected boundary. Also, the distance measuring sensors 250 could be spaced in a N×M array where N is the number of rows of sensors 250 and M is the number of sensors 250 in a row. With additional sensors 250, a more accurate boundary can be detected.

Figure 7A:
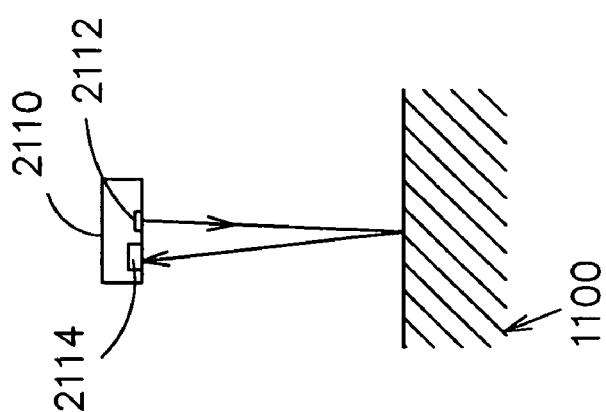
FIG. 7A is a front pictorial view of the infrared distance measuring sensor.
Figure 7B:
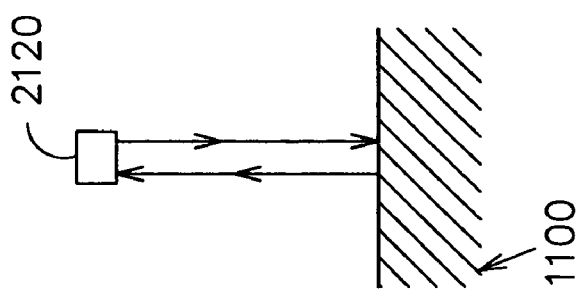
FIG. 7B is a front pictorial view of the ultrasonic distance measuring sensor.
Figure 7C:
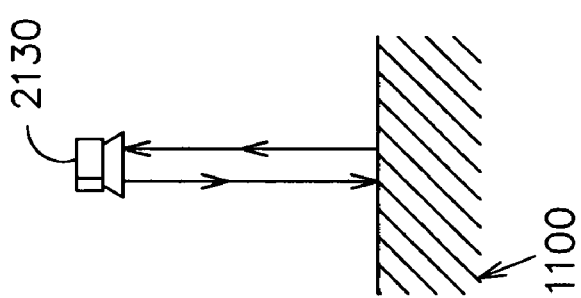
FIG. 7C is a front pictorial view of the radar distance measuring sensor.
Figure 7D:
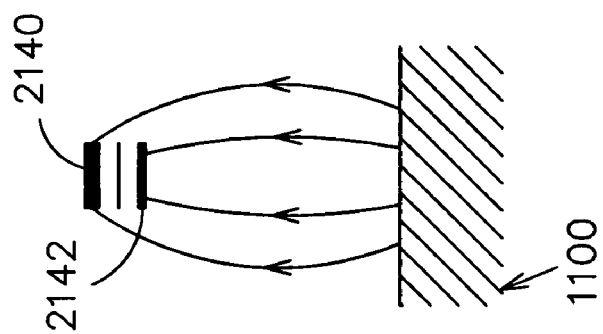
FIG. 7D is a front pictorial view of the capacitance distance measuring sensor.

FIGS. 7A-7D shows four preferred distance measuring sensors use as sensor 250. These distance measuring sensors use different methods to derived distance. In FIG. 7A, an infrared sensor 2110 transmits an infrared signal from infrared LED 2112 and receives the reflected response in integrated circuit 2114. The angle between the transmitted and received signals determines the distance based on geometry. Sharp Corporation is one manufacturer that produces these types of sensors and denoted these products as GP2D12, GP2D15, GP2D120, etc. The measuring sensor 2120 in FIG. 7B uses ultrasonics to determine the distance to the surface 1100. The ultrasonic measuring sensor 2120 transmits a sound wave pulse and receives the echo from the surface 1100. By comparing the time between the transmitted pulse and the received pulse, the distance can be determined. The distance measuring sensor 2130 in FIG. 7C uses microwaves to determine the distance to the surface 1100. A wideband radar pulse is transmitted at the surface 1100 and the received echo is compared with the transmitted pulse to determine the distance. The measuring sensor 2140 in FIG. 7D is a capacitance distance measuring sensor. The extra capacitance plate 2142 extends the range of the capacitance sensor. The distance is derived from the capacitance measured from the surface 1100. The capacitance is greater when the measurement sensor 2140 is closer to the surface 1100 and less if the sensor 2140 is further away. There are other distance measuring sensors such as laser distance sensor and vision distance sensors that could also be used for distance measuring sensor 250 of the invention.

Figure 8:
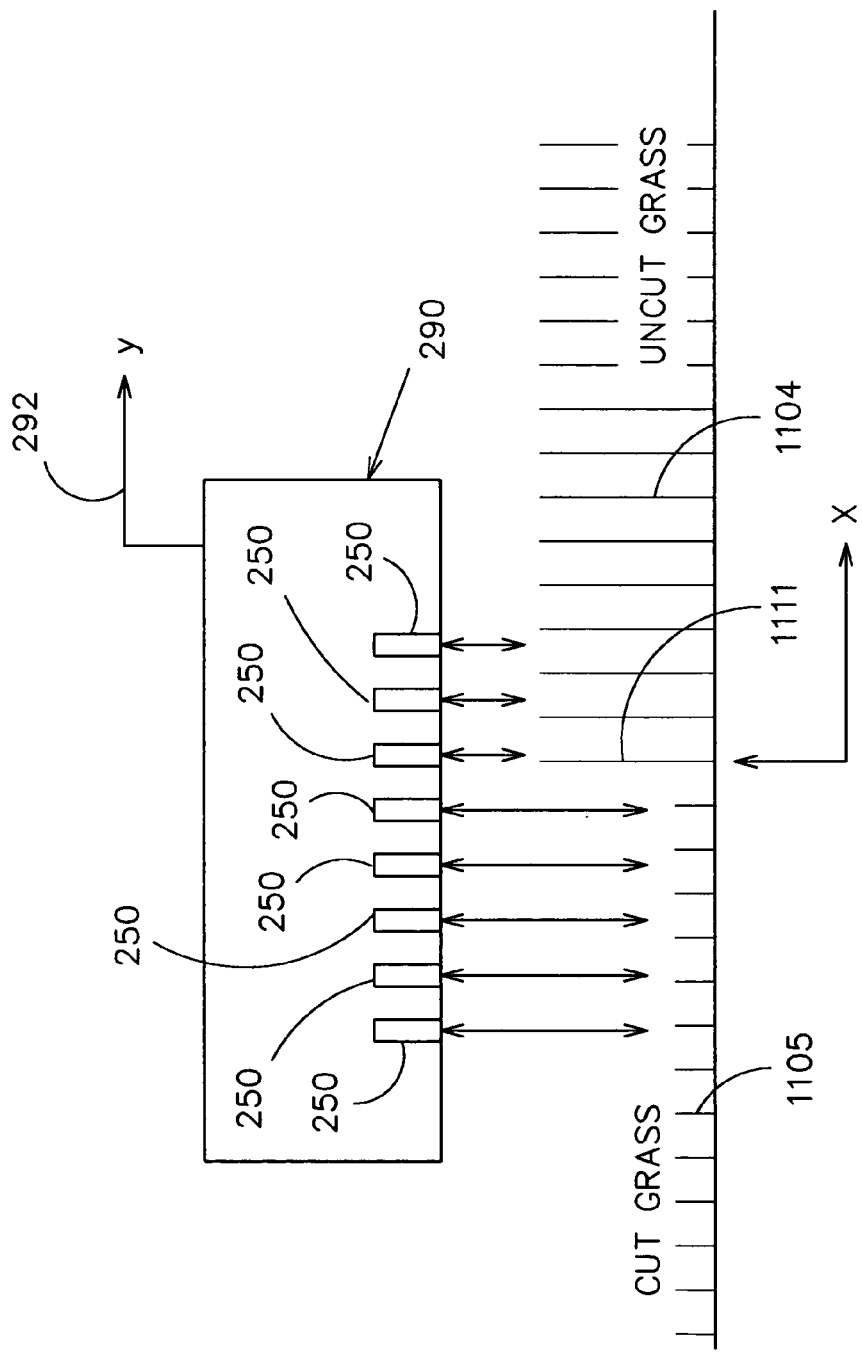
FIG. 8 is a front view of the boundary sensor following a boundary between mowed and un-mowed vegetation.

FIG. 8 shows another embodiment 290 which is use in the application for detecting the boundary between the cut grass 1105, a relatively lower surface, and that of the uncut grass 1104, a relatively higher surface. As similarly described above, the sensors 250 measure the distances from the sensor array frame to either the relatively lower surface in this case, the cut grass 1105, or the relatively higher surface, the uncut grass 1104. By comparing the distance measurements from the two surfaces of different levels to a reference measurement, the number of sensors 250 in the cut grass 1105 and the uncut grass 1104 can be determined. The output y 292 indicates the boundary between the cut and uncut grass by the number of sensors in each region.

Another application of the invention as shown in FIG. 9 is detecting the curb 109 between the street 107 and the sidewalk 106. The embodiment 295 in FIG. 9 would provide guidance signals to a street scrubber. In this embodiment 295, an array of distance measuring sensors 2500 provide digital output that measures a fixed height h0. Sharp Corporation is one manufacturer that produces these types of digital distance sensors and denoted these products as the GP2Y0D810Z0F, GP2Y0D805Z0F, and GP2Y0D805Z0F. In this configuration, the street 107 is at height h2 which is greater than h0, and therefore, the sensor 2500 output is a high logic. The height of the curb is h1 which is less than h0, and therefore, the sensor 2500 output is a low logic. The digital outputs from these sensors 2500 are processed in the microcontroller 270 where the boundary can be determine from the logic levels similarly as the comparison in previous embodiments. The boundary between the sensors 2500 can be determined from the number of sensors 2500 detecting the street or the sidewalk. Here, the apparatus is set a fixed distance from the surfaces.

Figure 10A:
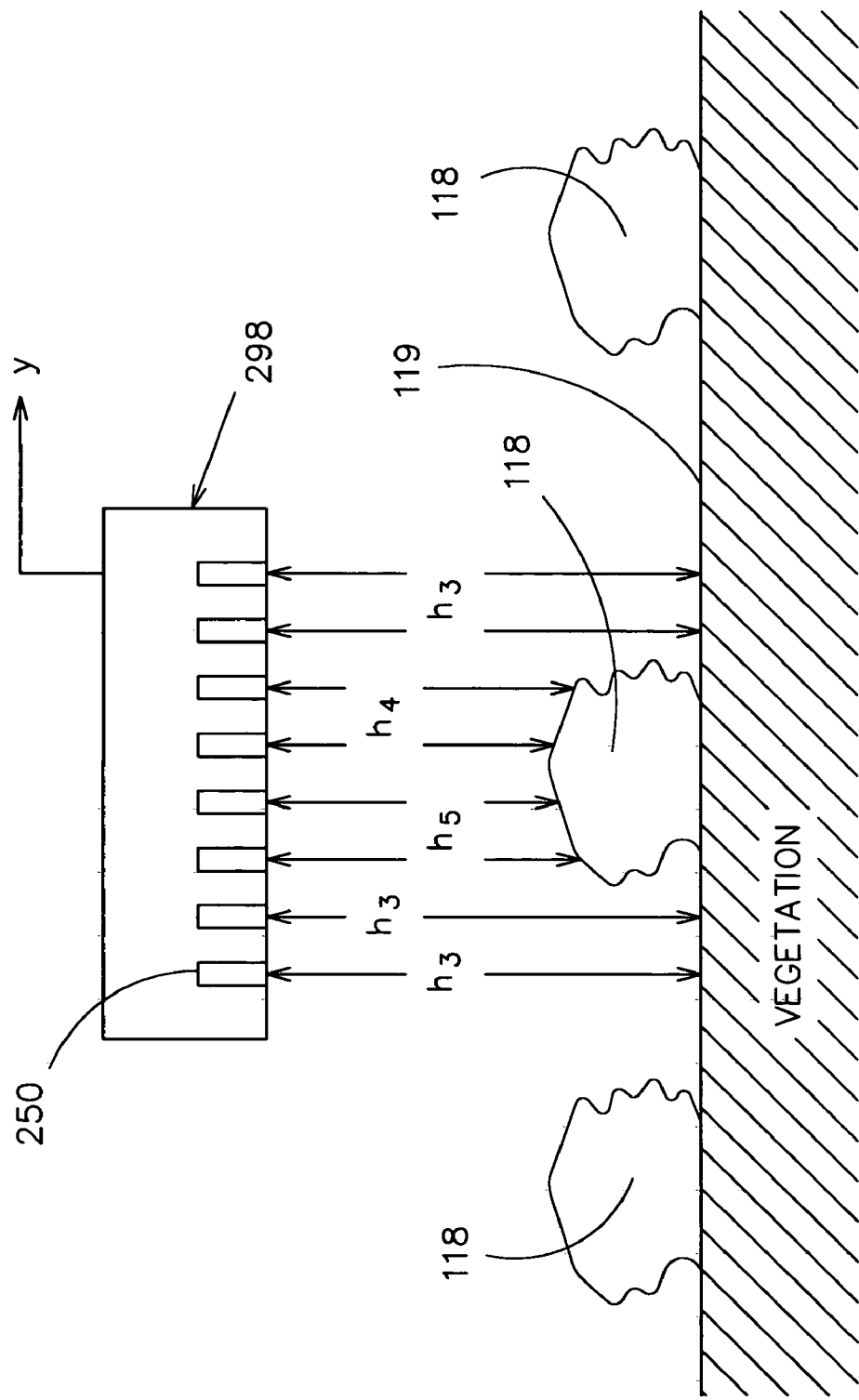
FIG. 10A is a front view of the boundary sensor following a row of vegetation.

Another application of the invention is detecting the vegetation 118 in a field as shown in FIG. 10A. The embodiment 298 would detect the height distance h3 between the relatively lower surface 119 on both sides of the vegetation and compare to the higher measurement heights from the relatively higher surface of the vegetation 118. By processing the various heights from the sensors, the location of the vegetation can be determined within the sensor array.

Figure 10B:
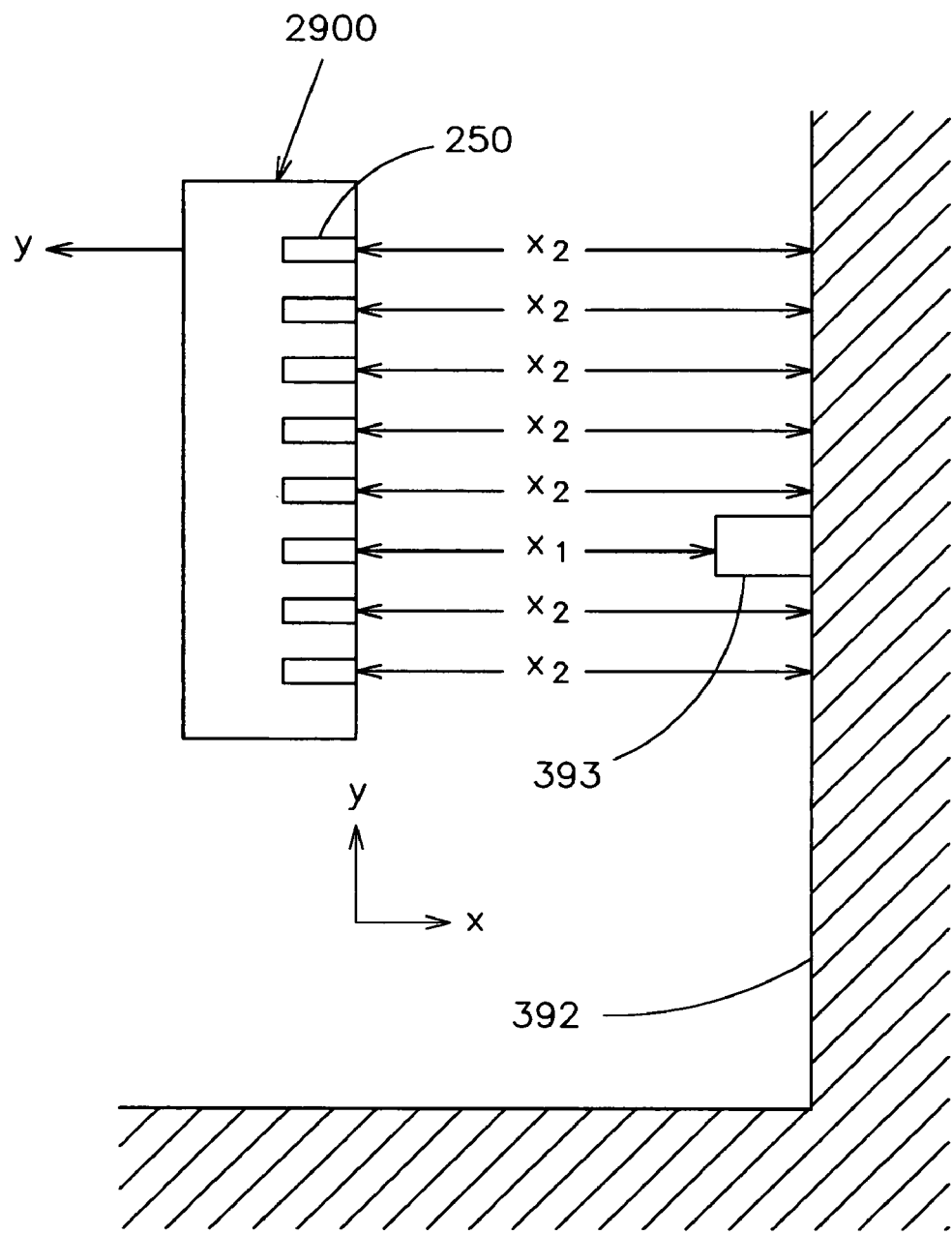
FIG. 10B is a front view of the boundary sensor following a beam attached to a wall.

Mounting the embodiment in a vertically direction instead of horizontally allows one to detect a beam. FIG. 10B shows an application of the invention detecting a beam 393, a relatively closer surface, and comparing this surface to the relatively farther surface 392, the wall. The embodiment 2900 would process the distance measurements to determine where the beam 393 is located relative to the vertical sensor array.

Figure 11:
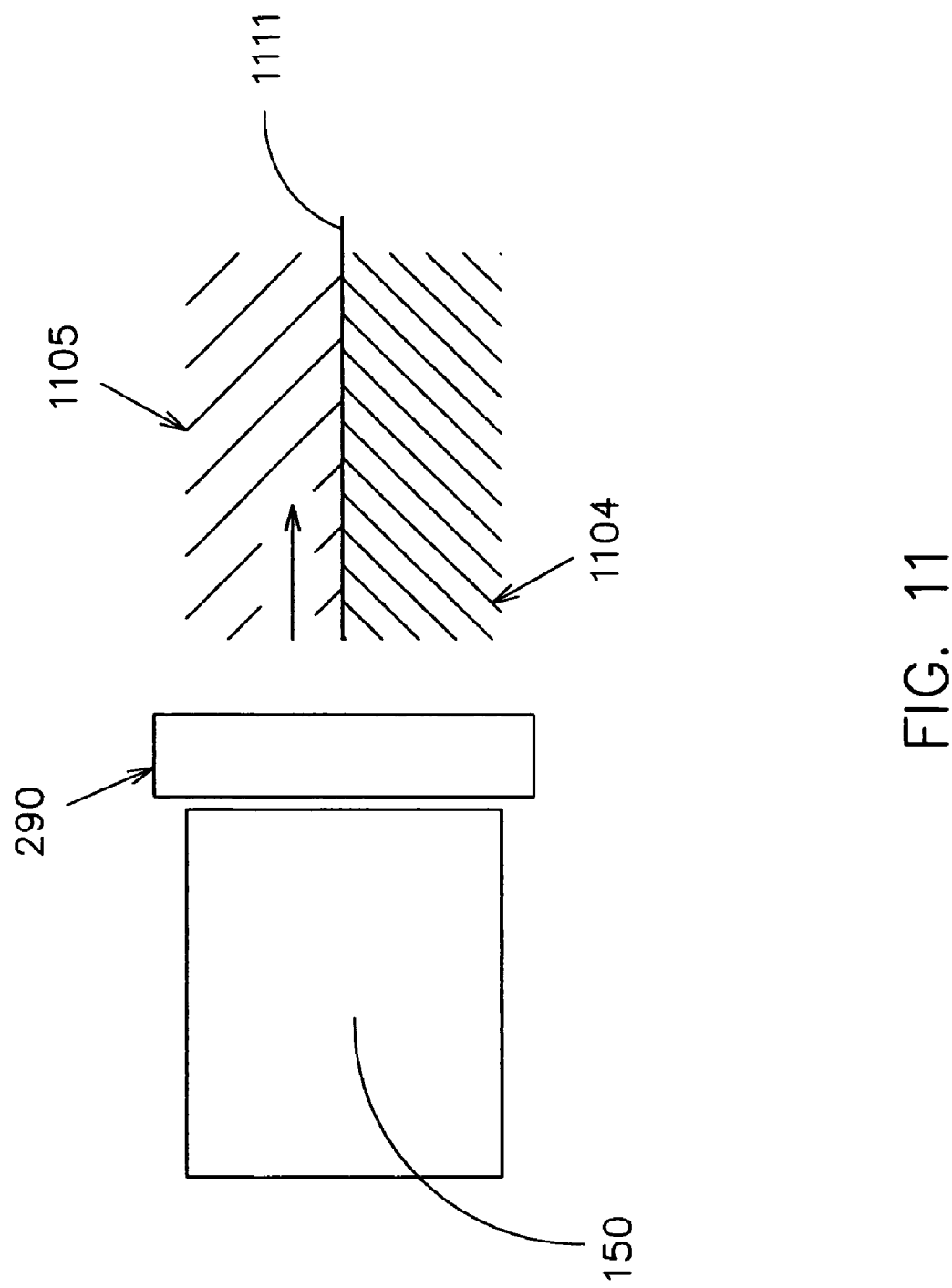
FIG. 11 is a top view of a vehicle with the boundary sensor mounted on the front of the vehicle.

FIG. 11 shows a top view of the boundary sensor 290 mounted on the front of a vehicle 150. In this application, the boundary sensor detects the boundary 1111 from comparing the number of internal sensors detecting the relatively higher surface 1104 to the number of internal sensors detecting the relatively lower surface 1105. The boundary sensor 290 is providing guidance signals to the vehicle 150 to steer the vehicle 150 along the boundary 1111.

The boundary sensor 290 can be mounted on a vehicle 150 in different configurations as illustrated in FIGS. 12A-12M. In FIG. 12A, the boundary sensor 290 is mounted on the front of the vehicle. In FIG. 12B, the boundary sensor 290 is mounted on the left side of the vehicle 150. In FIG. 12C, two boundary sensors 290 are mounted on the left and right front sides. In FIG. 12D, the boundary sensor 290 is mounted on the right side of the vehicle 150. In FIG. 12E, two boundary sensors 290 are mounted on the left and in FIG. 12F; two boundary sensors are mounted on the right. This configuration would be used to determine vehicle orientation in addition to detecting the boundary. FIG. 12G illustrates four boundary sensors are mounted, these additional sensors would provide redundant information and orientation of the vehicle. FIG. 12H shows front and rear mounted boundary sensors 290. With this arrangement, the vehicle can be offset to anywhere within the sensor array.

The configuration in FIG. 12I provides redundant sensors on the left and likewise, the configuration in FIG. 12L provides redundant sensors on the right. FIG. 12K shows the redundant sensors in the centered. The redundant sensors provide vehicle orientation and higher accuracy in determining the boundary. FIG. 12J shows a smaller version of what is shown in FIG. 12A. FIG. 12M shows mounted sensor arrays at different reference heights. This different in mounting distances allows for multiple digital distance measuring sensors. There are many other possible configurations such as mounting three boundary sensors instead of two or one boundary sensor on a side.

Figure 13:
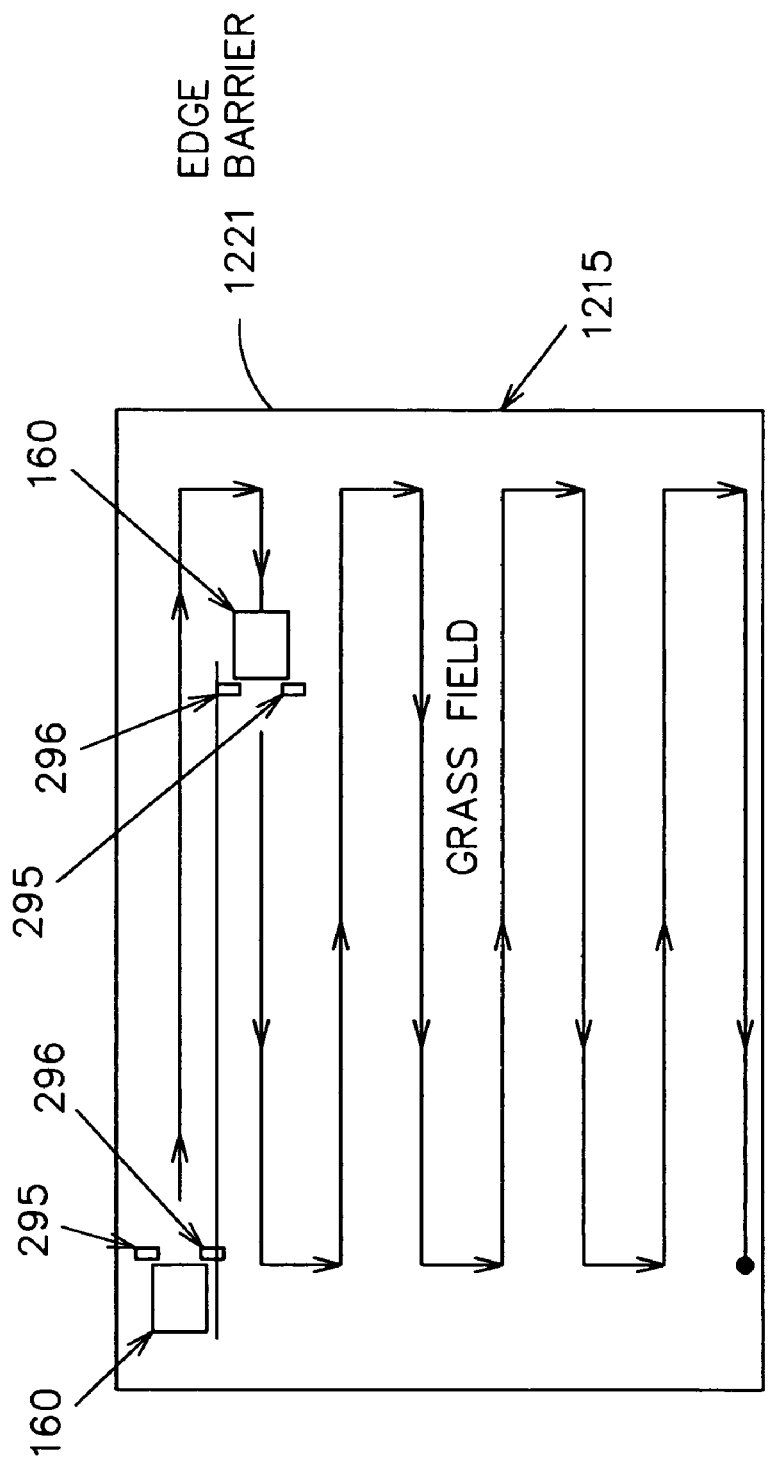
FIG. 13 is a top pictorial view of a mowing vehicle with boundary sensors following a path in the field back and forth.

As shown in FIG. 13, two boundary sensors 295 and 296 are mounted on a mowing vehicle 160. The mowing vehicle 160 runs autonomously in a field 1215 with the guidance signals from the boundary sensors 295 and 296. On the first pass of the lawn, the boundary sensor 295 detects the edge 1221 which is between the grass field 1215 and another substance such as flower bed, a sidewalk border, a soil barrier, etc. The mowing vehicle 160 turns 180 degrees around when detecting the end of the field and on the second pass, tracks using the boundary sensor 296 where the cut and uncut grass boundary. The mowing vehicle 160 is travelling in the opposite direction. As the mowing vehicle cuts the grass, a new boundary is created. At the end of the field, the mowing vehicle 160 turns 180 degrees and travels in the opposite direction on the newly created boundary with boundary sensor 295. This scenario is repeated until the field is mowed by detecting the opposite edge of the field 1215.

Figure 14:
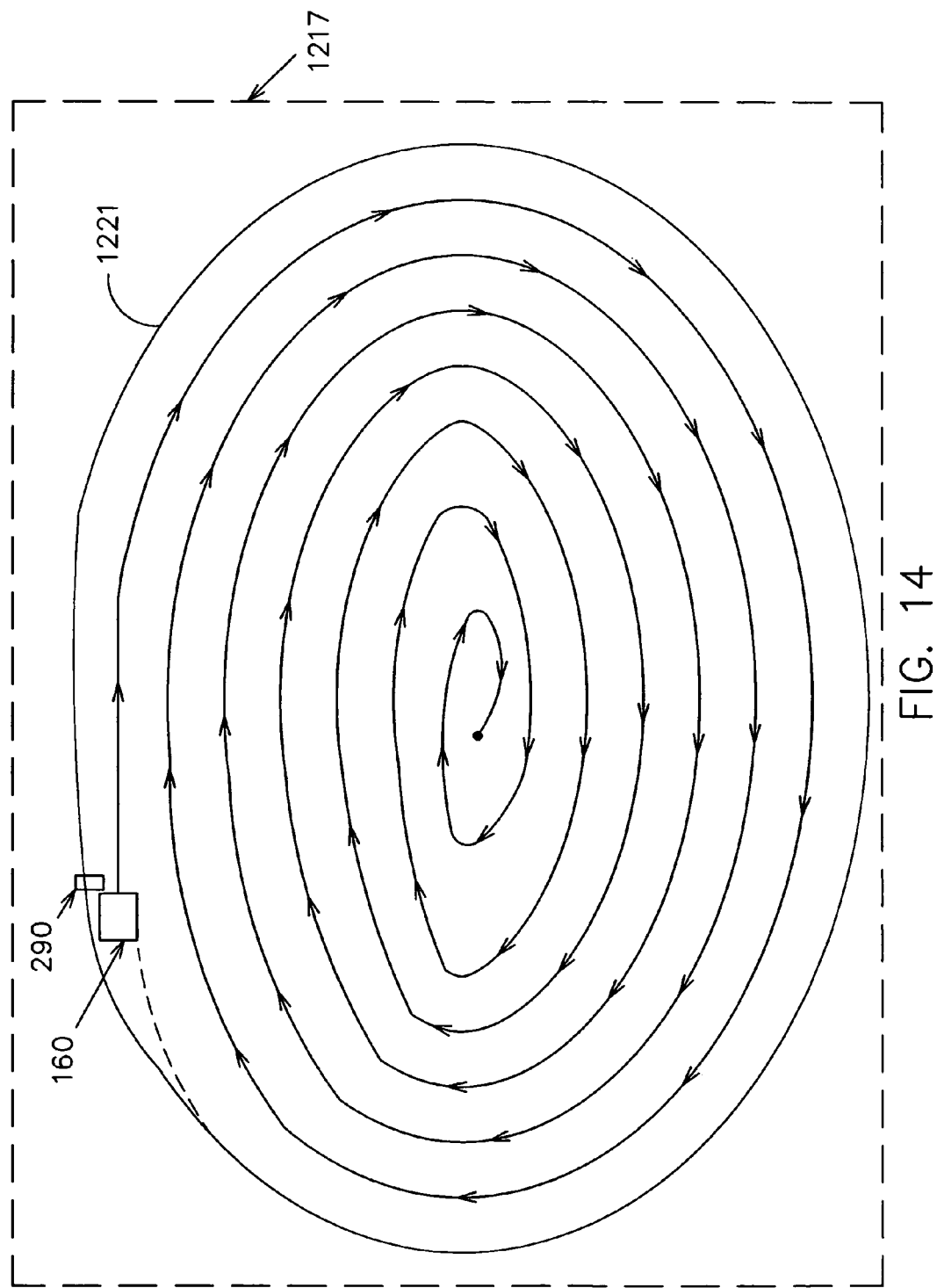
FIG. 14 is a top pictorial view of a mowing vehicle with boundary sensor following a spiraling path in the field.

FIG. 14 shows an autonomous mowing vehicle 160 guided by a single boundary sensor 290 to mow the field 1217 in a spiraling configuration. First, the boundary sensor 290 detects the field edge 1221 and guides the mowing vehicle around the field. During the first pass, the autonomous mowing vehicle 160 creates a new cut/uncut grass boundary. Then on second pass and thereafter, the boundary sensor 290 detects the cut/uncut grass boundary. The autonomous mowing vehicle will continue until the grass is mowed.

Figure 15:
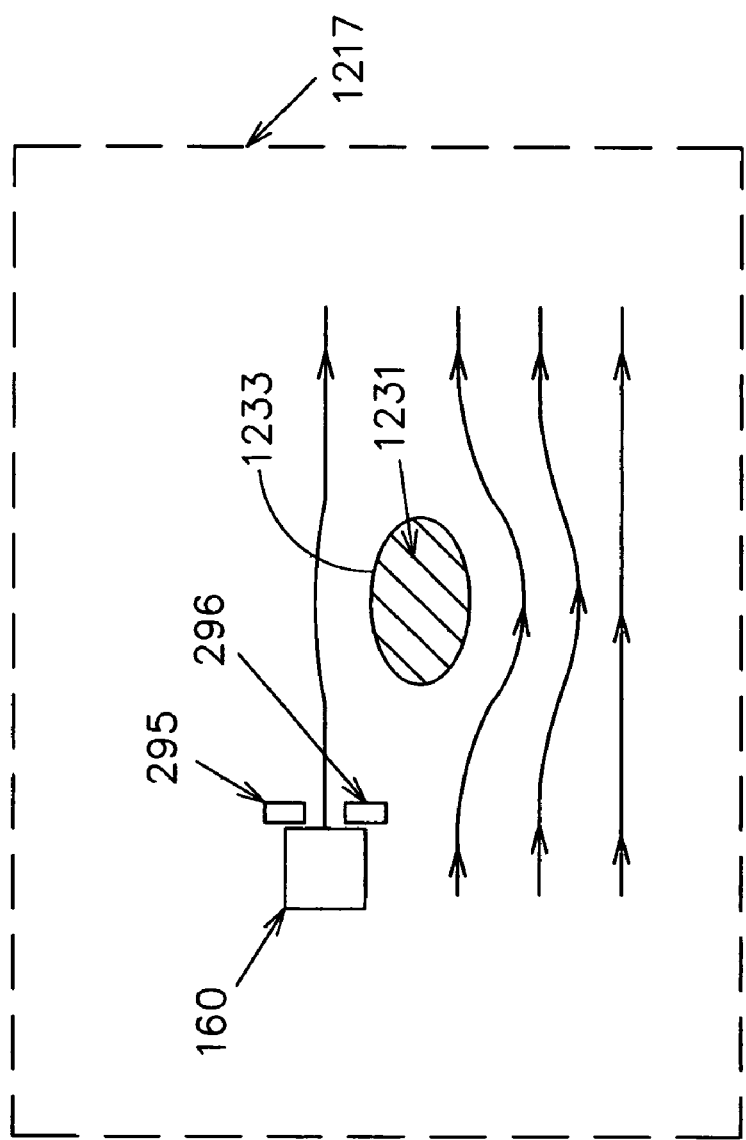
FIG. 15 is a top pictorial view of a mowing vehicle with boundary sensors following a path around an obstacle in an oval pattern.
Figure 16:
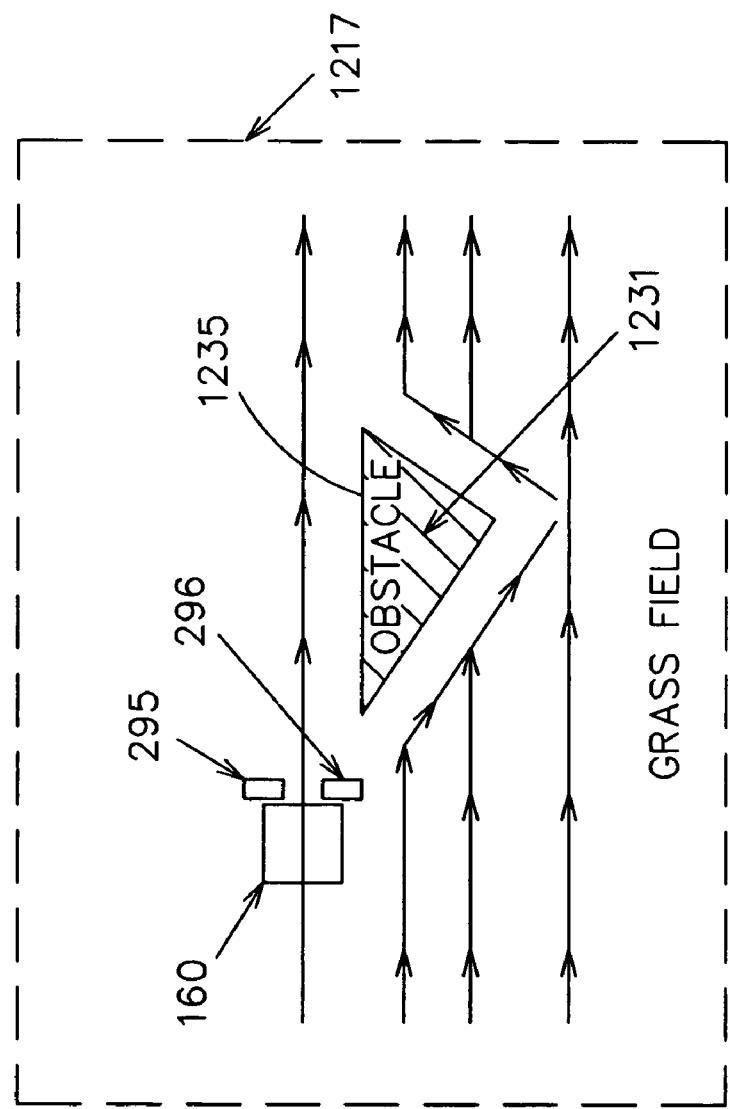
FIG. 16 is a top pictorial view of a mowing vehicle with boundary sensors following a path around an obstacle in a triangular pattern.

If a tree or another obstacle 1231 is in the middle of the field 1217 such as illustrated in FIG. 15, the autonomous mowing vehicle will use the guidance signals from the cut/uncut grass boundary until the boundary sensor detects the edge 1233 around the obstacle. The edge 1233 would be a lower surface than the cut or uncut grass and easily distinguish by the boundary sensors 295 and 296. The autonomous mowing vehicle would travel around in a clockwise direction using boundary sensor 296. As more grass is mowed, the autonomous mowing vehicle would use the guidance signal from the boundary sensor 295 in a counterclockwise direction around the obstacle 1231. In FIG. 16, the grass field 1217 has an obstacle 1231 in the middle of the field. Here, the edge 1235 is in a triangular pattern around the obstacle. In a likewise manner as described earlier, the autonomous mowing vehicle would use the guidance signal from boundary sensor 296 along the edge 1235 and boundary sensor 295 around the triangular pattern. The two different patterns around the obstacle 1231 is a matter of appearance of the mowed lawn.

Figure 17:
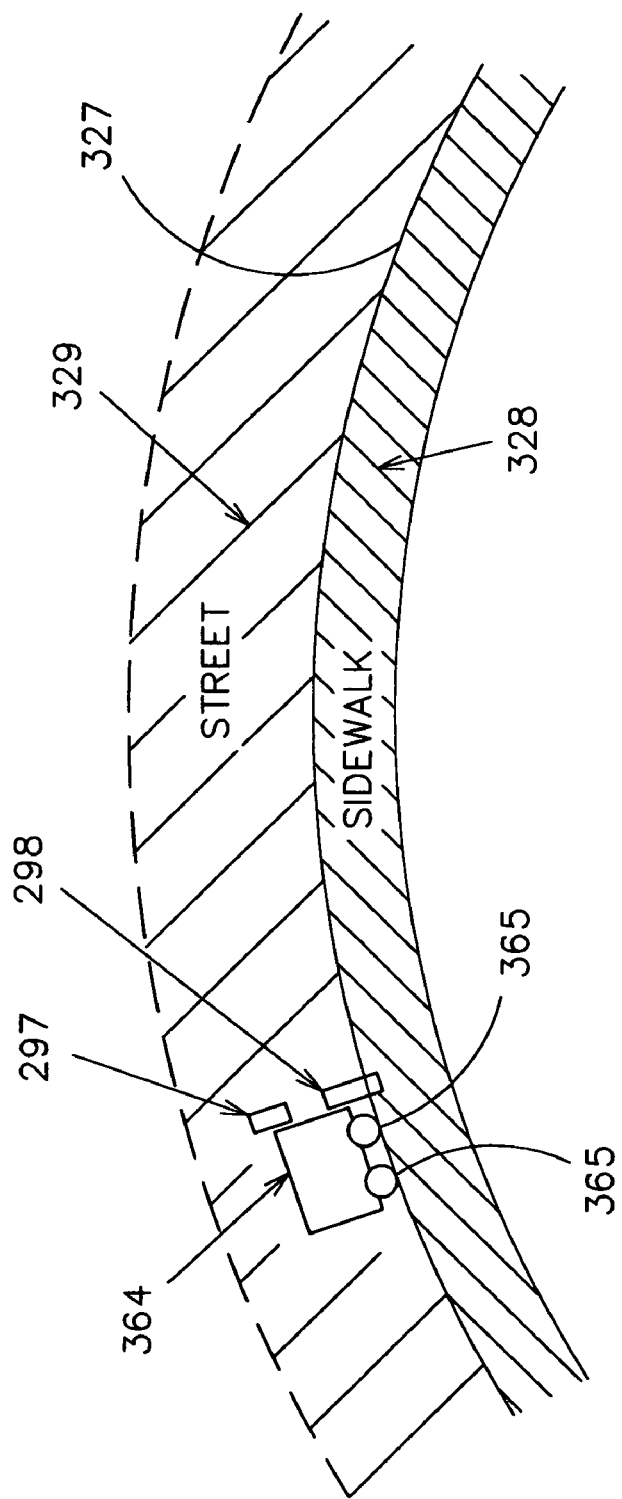
FIG. 17 is a top pictorial view of a street vehicle with boundary sensor following a curb on the street.

As shown in FIG. 17, a robotic street scrubber 364 uses the boundary sensor 298 for guidance signals to steer the street scrubber 364 along the curb 327. The robotic street scrubber 364 is guided by the boundary sensor 298 detecting the curb edge 327. The robotic scrubber 364 travels along the street 329 and cleans the curbs using brushes 365. The boundary sensor 298 detects the curb edge 327 and provides guidance signals to the robotic scrubber to steer the vehicle along the curb edge.

Figure 18:
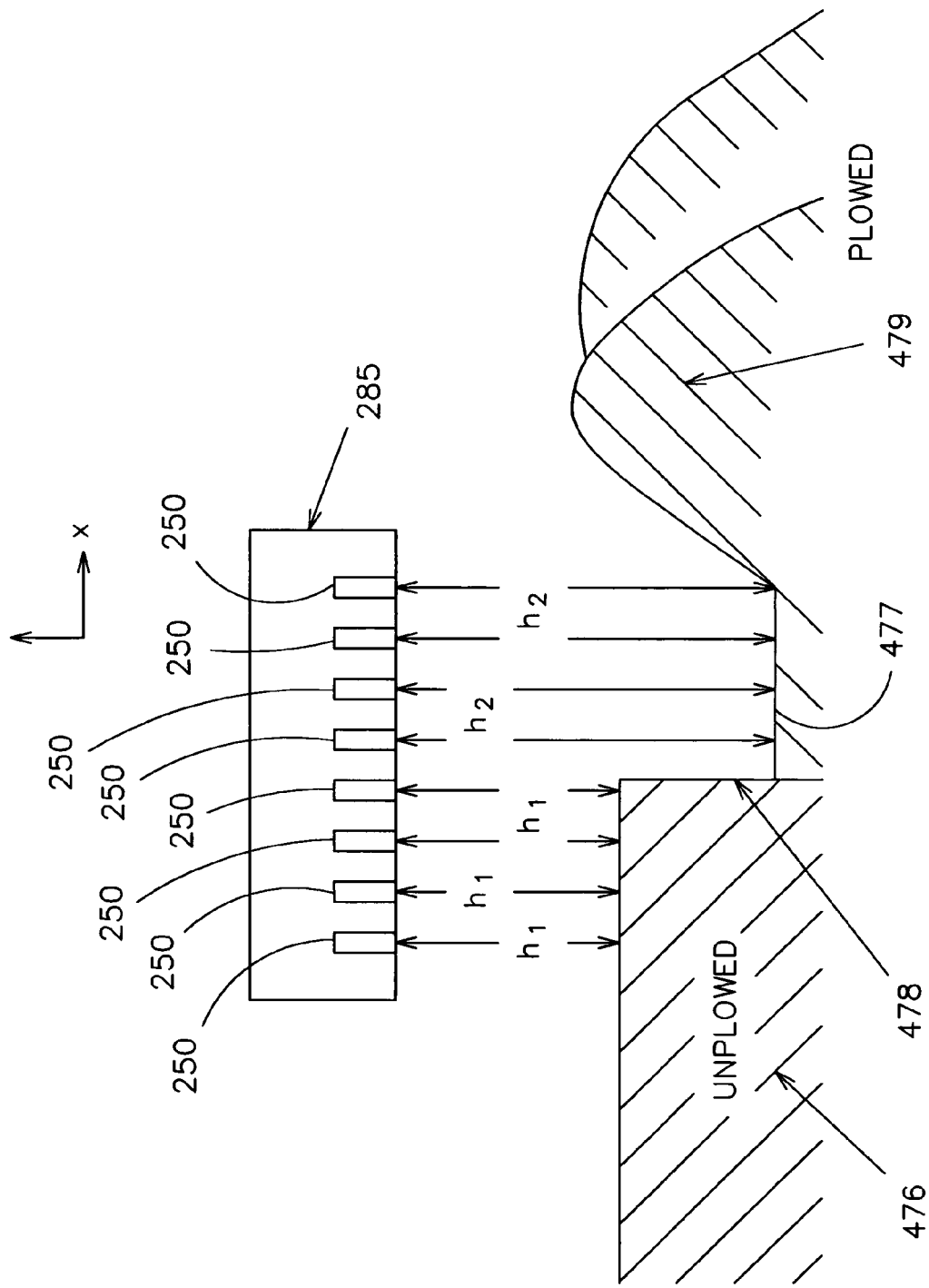
FIG. 18 is a front view of a boundary sensor following a plowed furrow.

FIG. 18 shows the boundary sensor 285 detecting the boundary 478 between the plowed 479 and unplowed 476 fields. The distance measuring sensors 250 in the sensor array detects the relatively higher surface 476, the unplowed field, and the relatively lower surface 477, the plowed field. Comparing the number of distance measuring sensors 250 in the two regions, the boundary between the plowed and unplowed field can be determined. Using the boundary sensor 285 in this application, the agriculture tractor can be automatically steering along the plowed field.

Figure 19:
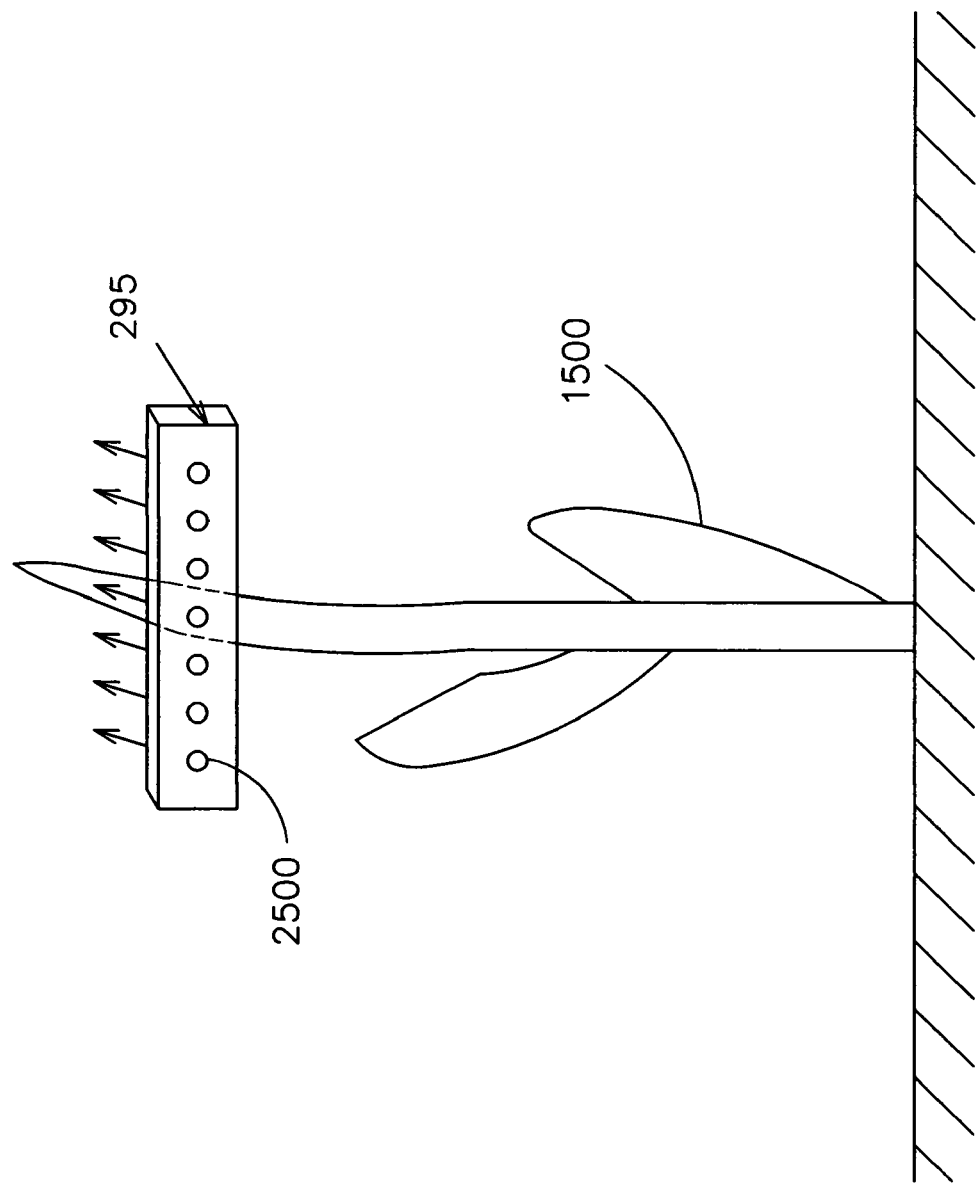
FIG. 19 is a front view of a boundary sensor faced in horizontal direction following a upright vegetation.

In FIG. 19, the boundary sensor 295 is mounted in a horizontal configuration where the sensors 2500 are facing forward. The measuring sensors 2500 detect the presence or absence of the foliage or vegetation 1500. In this mounting arrangement, the distance measuring sensors 2500 either detect a surface such as foliage 1500 or not.

Figure 20:
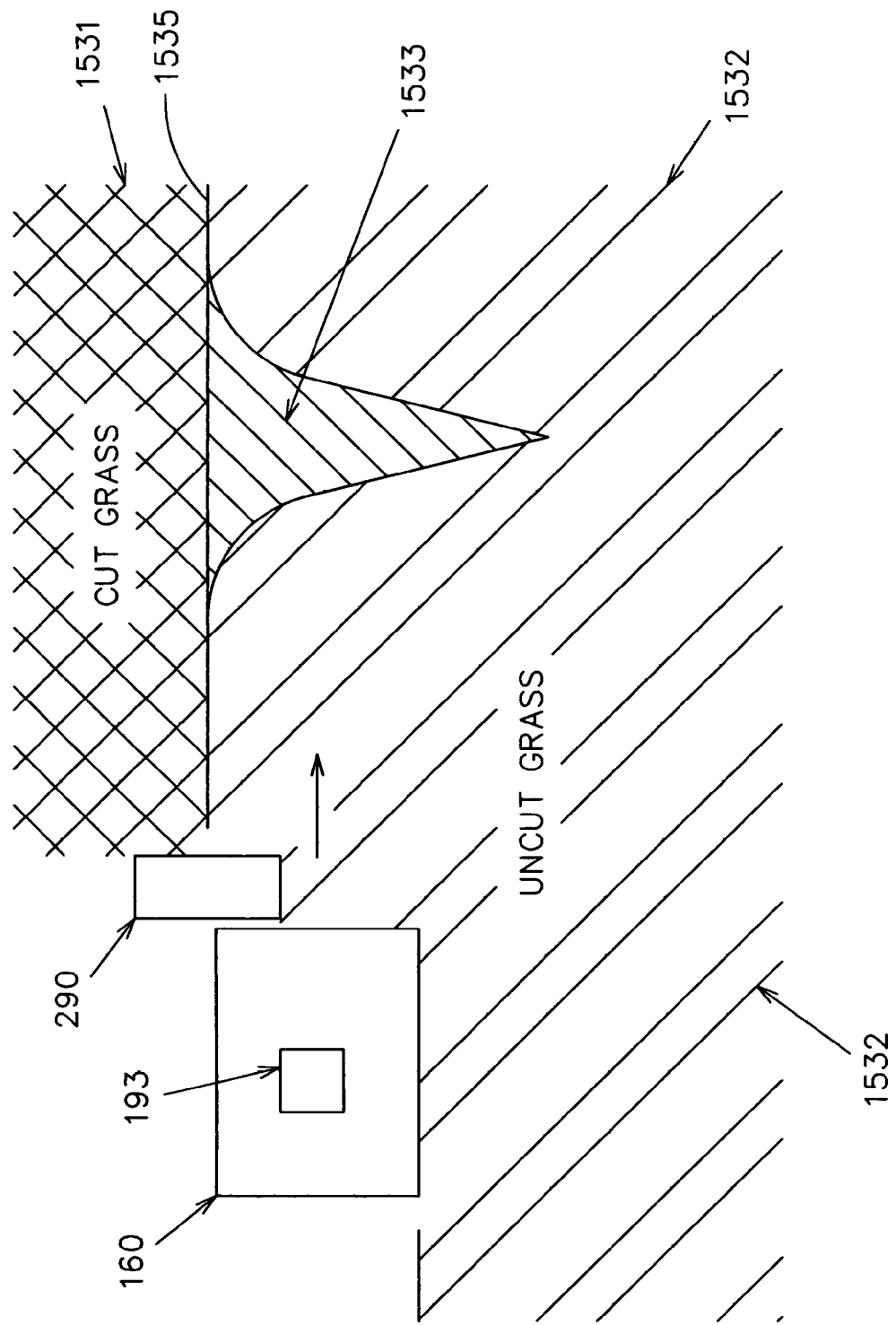
FIG. 20 is a top pictorial view of an embodiment detecting a boundary between mowed and un-mowed vegetation where there is a gap in the vegetation.
Figure 21:
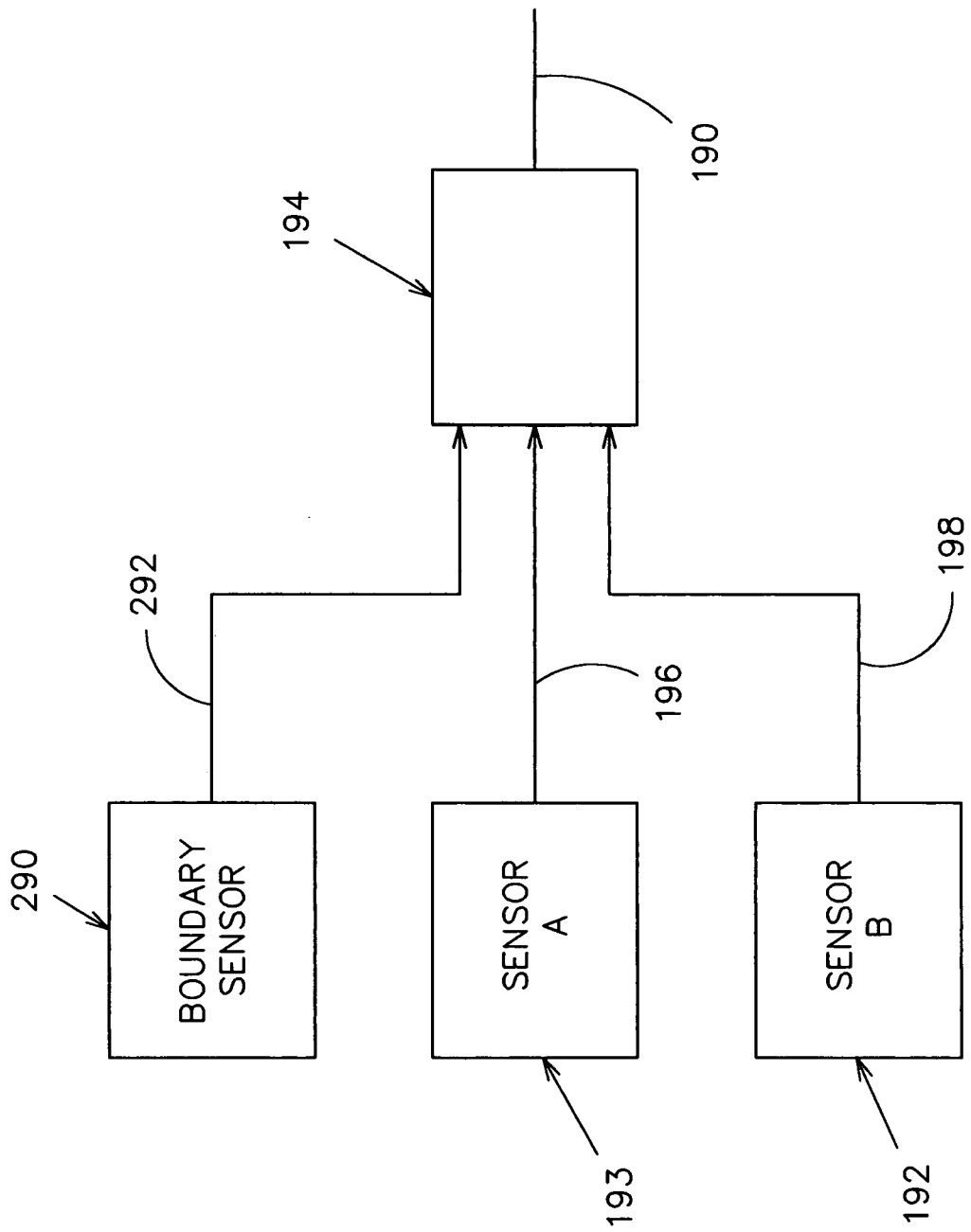
FIG. 21 is a block diagram of the boundary sensor integrated with other sensors.
Figure 22:
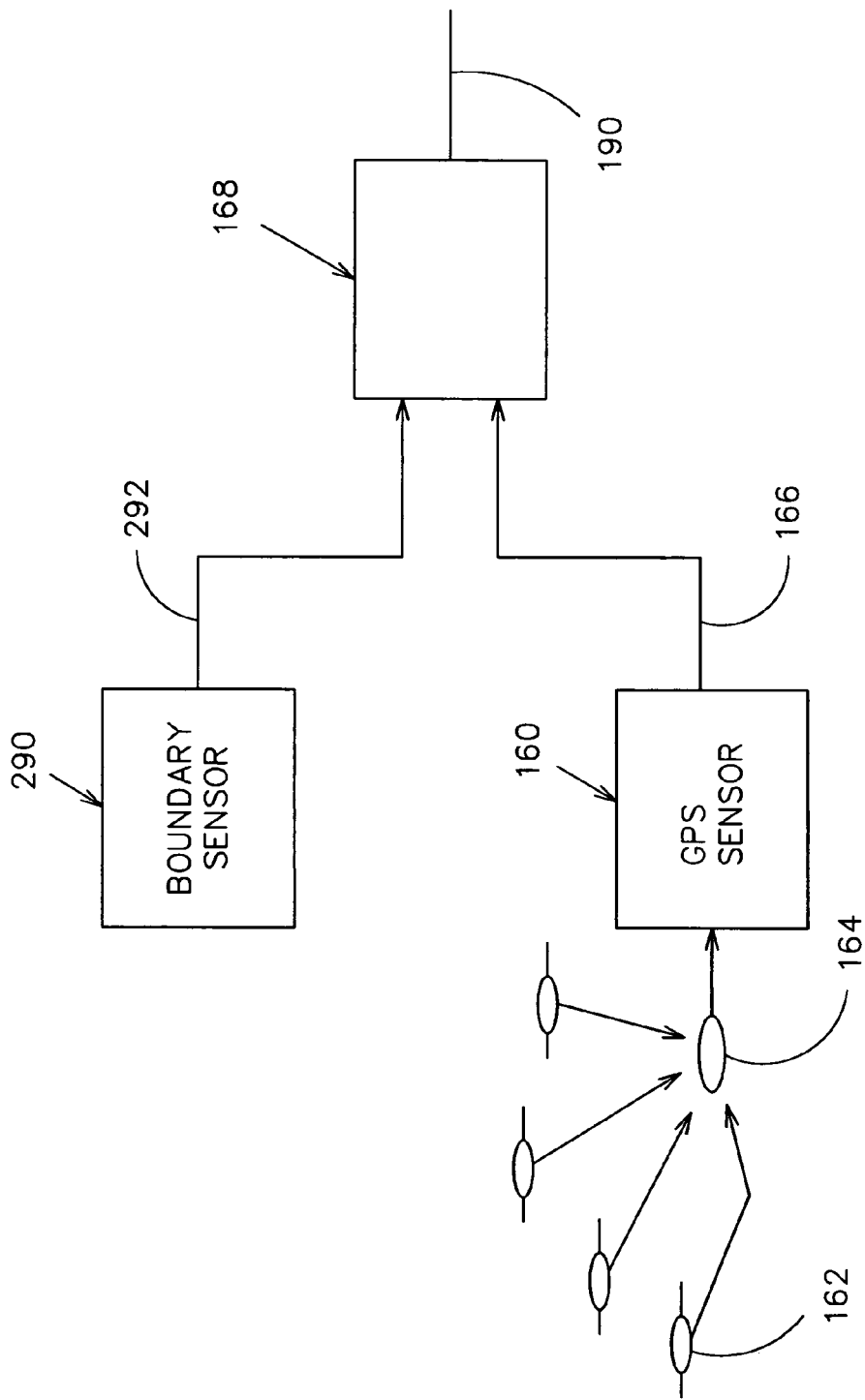
FIG. 22 is a block diagram of the boundary sensor integrated with a GPS sensor.
Figure 23:
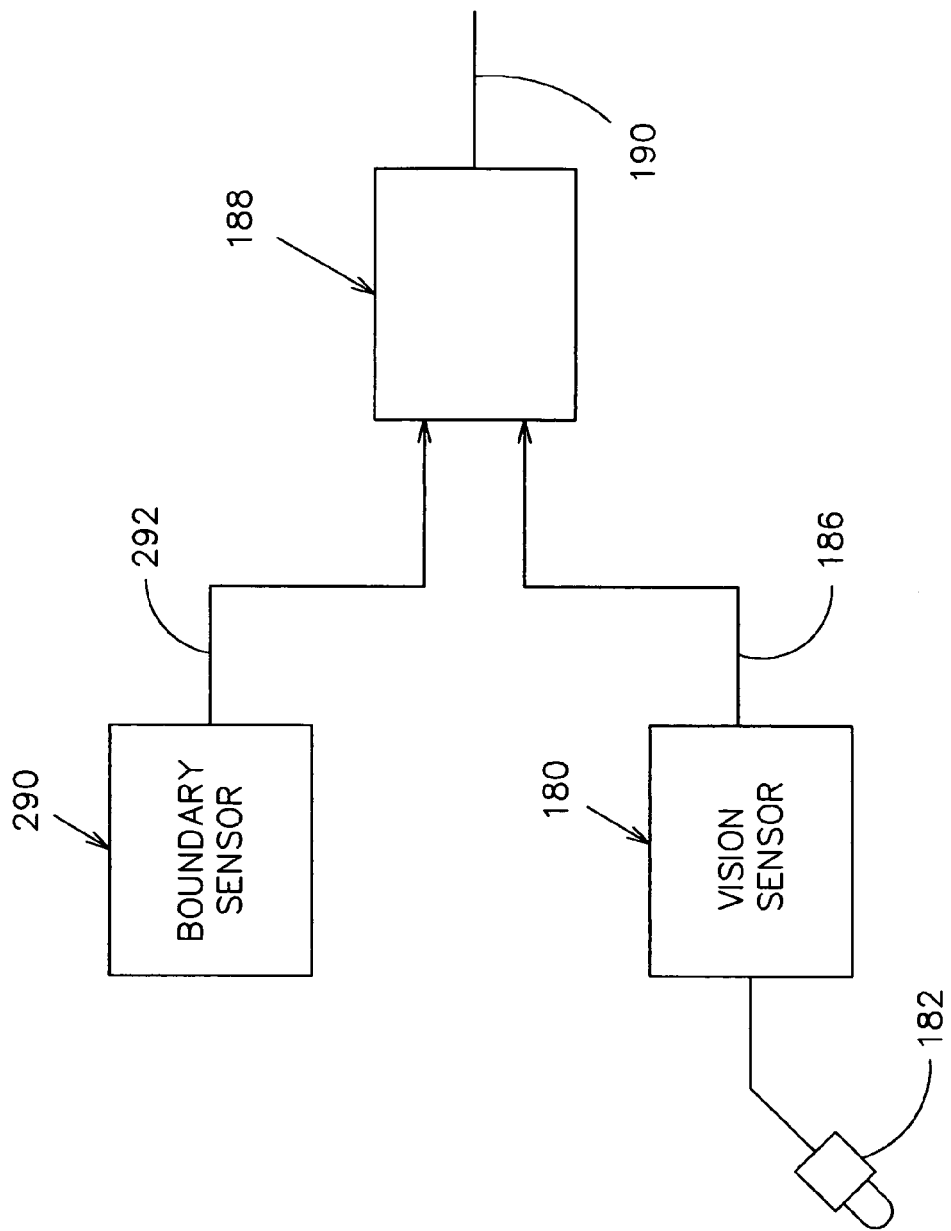
FIG. 23 is a block diagram of the boundary sensor integrated with vision sensor.

In FIG. 20, the mowing vehicle 160 detects the boundary 1535 between the cut 1531 and uncut grass 1532. However, if there is a gap 1533 in the detected boundary, the boundary sensor will detect no boundary and may provide incorrect guidance information to the robotic mower 160. One way to prevent this concern is to use another type of sensor called a navigational sensor 193 which provides guidance information from same or other references. Navigational sensors 193 may be gyros, accelerometers, compass sensor, GPS sensor, a vision sensor, or others. FIG. 21 shows a method to integrate other sensors 193 to the boundary sensor 290 to provide a more robust guidance signal 190. The boundary sensor 290 outputs a measurement 292 of the detected boundary and the other sensors 192, and 193, provides another guidance signal 198 and 196, respectively. The two signals are combined using a Kalman filter 194 to provide a robust guidance signal 190. These other sensors can be a GPS sensor 160 as shown in FIG. 22, a vision sensor 180 as shown in FIG. 23. In FIG. 22, the U.S. Global navigational satellites 162 are viewed by the GPS antenna 164 and the received signal is processed by the GPS sensor 160 to determine the vehicle location 166. The boundary sensor 290 provides information 292 on the path to travel. Using a computer 168 with a Kalman filter algorithm, the two signals are processed and provide a more accurate location of the vehicle. In FIG. 23, the camera 182 views the path in front of the boundary sensor 290 and provides information to the vision sensor 180. The processed information determines the vehicle location 186. Similarly, the boundary sensor 290 provides information 292 on the path to travel. Using a computer 188 with a Kalman filter algorithm, the two signals are processed and provide a more accurate guidance to steer the vehicle. Other navigational sensors can be gyroscopes, accelerometers, compass, odometers, guidance wires, RF signals, cell phone signals, Wi-Fi signals, etc. to determine the vehicle orientation or location.

Figure 24:
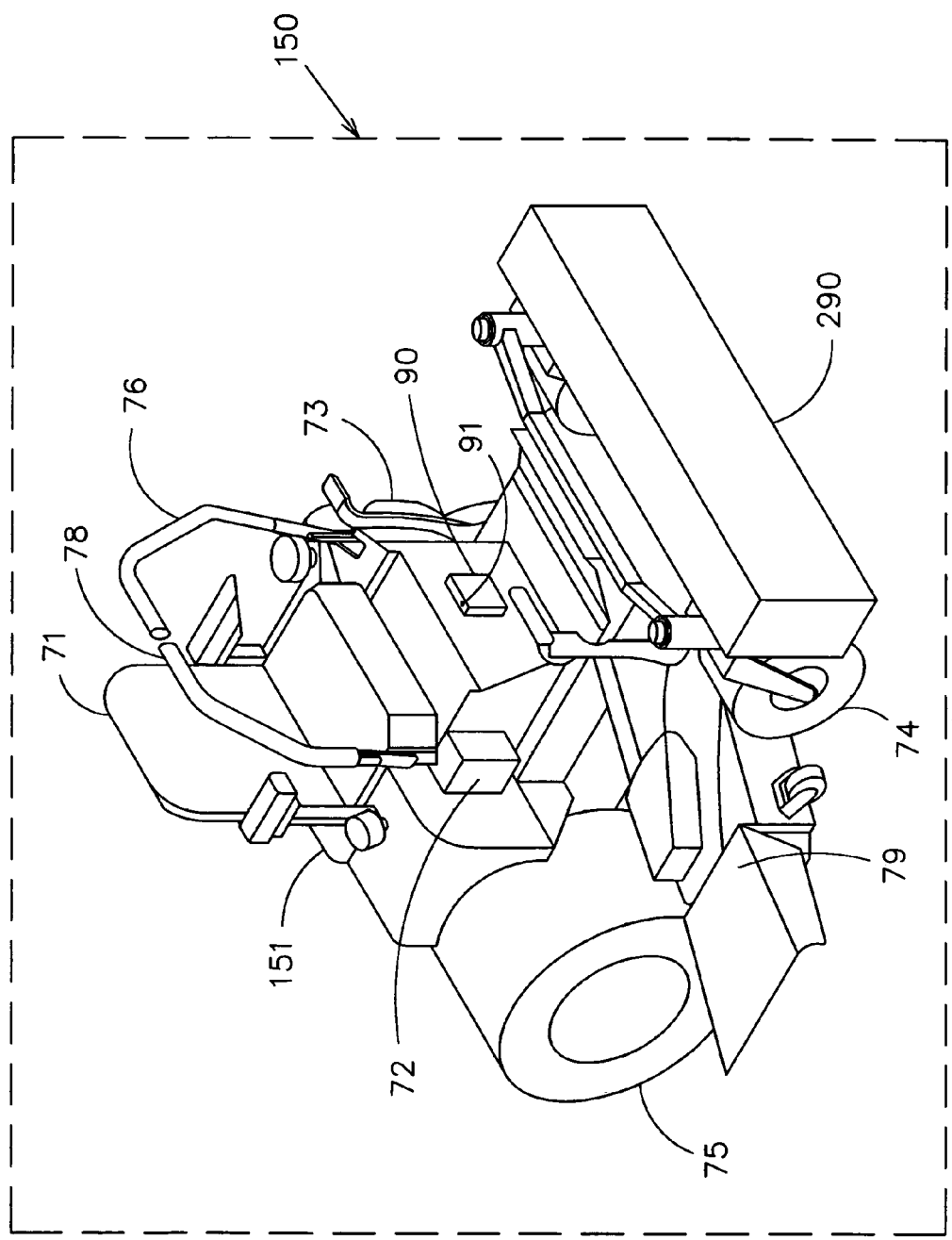
FIG. 24 is a pictorial view of a robotic vehicle with the boundary sensor.

FIG. 24 shows an application of the invention in guiding or controlling a semi-automated or automated mowing vehicle 150. The vehicle 150 has lever sensors 72 and 73, control levers 76 and 78, a controller 90, boundary sensor assembly 290, a mowing deck 79, wheels 74 and 75, vehicle power 151, and a operator's seat 71. A useful embodiment is to extend the boundary sensor assembly 290 laterally beyond the cutting swath affected by mowing deck 79 in order to minimize overlap between cutting swaths.

Figure 25:
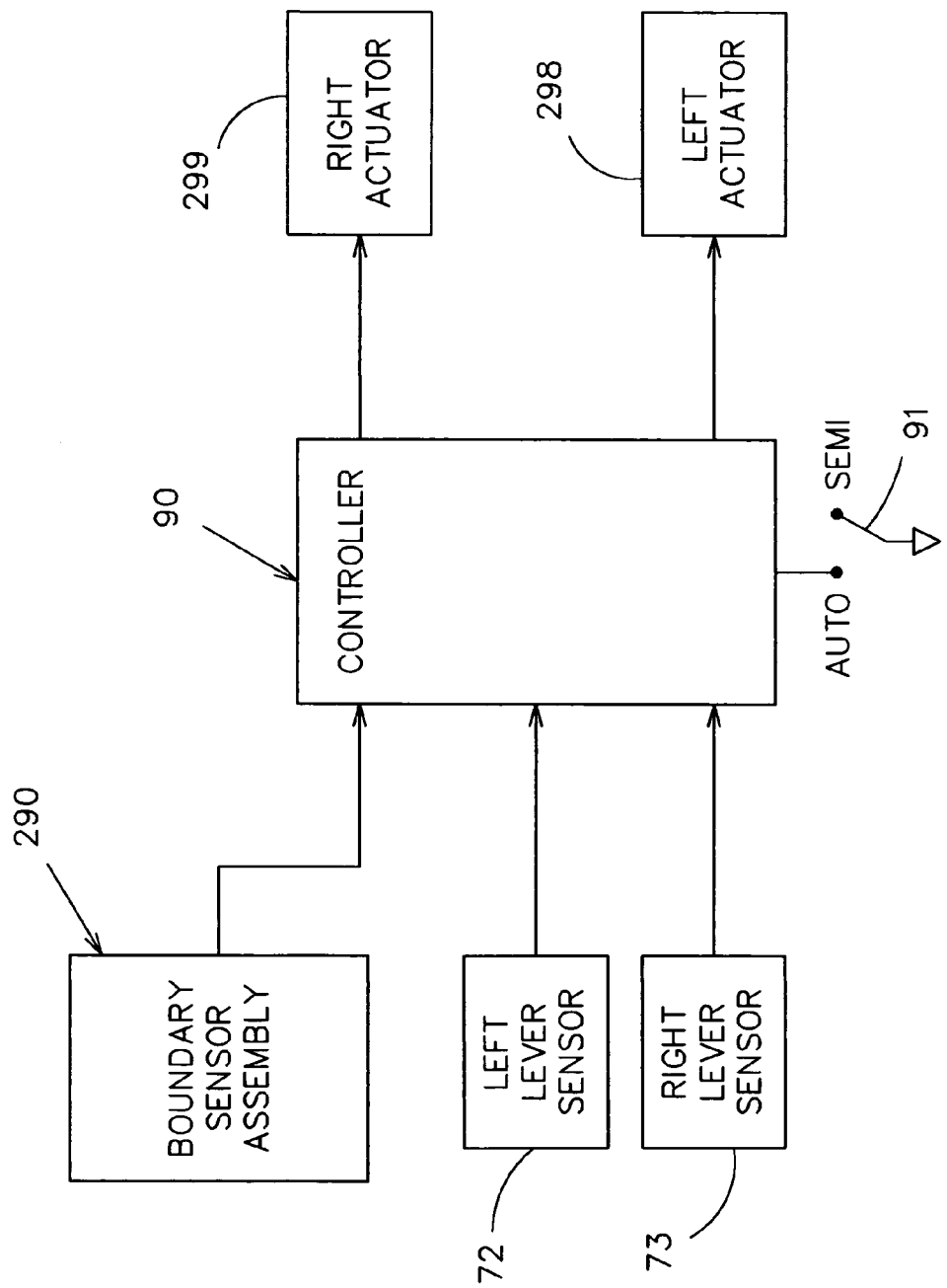
FIG. 25 is a block diagram of the control system of the robotic vehicle.

In the semi-automated mode, the riding lawn mower 150 can be controlled by a seated operator using the left control lever 76 and the right control lever 78. The left control lever 76 is connected to the left lever sensor 73 which in this embodiment contains a potentiometer. The right control lever 78 is connected to the right lever sensor 72, also contains a potentiometer. Lever sensors 72 and 73 can contain potentiometers, optical encoders, linear potentiometers, magnetic encoders, or other sensors indicating the movement of the levers. The operator controls levers 78 and 76 which in turn changes the lever sensors 72 and 73 settings. The sensors are connected to a controller 90 as shown in FIG. 25. The output of the controller 90 controls one or more actuators 298 and 299. Actuator 299 controls the right wheel via an electrohydraulic control valve for a hydrostatic drive mechanism or via direct drive electric motor to the right wheel 75. Likewise, the left actuator 298 controls the left wheel via electrohydraulic control valve or direct electric motor to the left wheel.

In the semi-automated mode, the operator can control the speed and steering of the vehicle 150 by the levers or can set the commanded speed via other controls and allow the boundary sensor 290 to control the vehicle steering along the cut and uncut vegetation, or may set the system to follow the boundary sensor 290 until a combination of rate and excursion of the levers 78 and 76 revert the controller 90 to following only the inputs of the levers 76 and 78. The front boundary sensor assembly 290 controls the vehicle steering 150 by following the boundary between the cut vegetation and the uncut vegetation. Shown in FIG. 25, the input to the controller 90 is from the sensor assembly 290 and the vehicle 150 is steered differentially in this configuration using the controller 90 to drive the left and right actuators 298 and 299 respectively.

In the autonomous mode via switch 91, the operator is not present, inputs from levers 76 and 78 are ignored, and the controller 90 controls the vehicle 150 around the vegetation based on the programmed vehicle speed and from the front boundary sensor assembly 290 which detects the boundary between two surface levels in this case the cut and uncut vegetation. For the first pass, the vehicle 150 can transverse the border between the vegetation, the relatively higher surface, versus the flower bed or sidewalk, the relatively lower surface, or the operator can cut a path where he/she would like the vehicle 150 to travel.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description.

The invention claimed is:

1. An apparatus for detecting a boundary between a first, relatively higher surface, and a second, a relatively lower surface, comprising:
   a) a plurality of non-contact distance measuring sensors aligned in a substantially linear array spaced apart from each other; and
   b) a control means for determining said distance sensors that measure said first relatively higher surface and said distance sensors that measure said second relatively lower surface.

2. An apparatus in claim 1, where the non-contact distance measuring sensors are optical, infrared, ultrasonic, radar, capacitive, laser, or vision.

3. An apparatus in claim 1, where substantially linear array is a number of sensors, M, aligned in at least one row, N.

4. An apparatus in claim 1, where substantially linear array is a number of sensors, M, in multiple linear rows, N, where the rows, N, are at various reference distances from first relatively higher surface.

5. An apparatus in claim 1, where control means is electronic circuits.

6. An apparatus in claim 1, where control means is microcontroller.

7. An apparatus in claim 1, where the boundary designates the cut and uncut vegetation.

8. An apparatus in claim 1, where the boundary designates the curb between the sidewalk and the street.

9. An apparatus in claim 1, where the boundary designates the furrow between plowed and un-plowed field.

10. Apparatus in claim 1, where the boundary designates the row of vegetation.

11. Guidance apparatus for a robotic vehicle comprising;
   a) at least one boundary sensor which contains a plurality of non-contact distance measuring sensors aligned in essentially transverse to the normal direction of travel of said vehicle in which the boundary is determined between the distance sensors measuring a first, relatively higher surface, and said distance sensors measuring a second, relatively lower surface;
   b) a navigation sensor means which determines the location of the vehicle; and
   c) a computer means which integrates the boundary sensor with the navigation sensor to provide a guidance signal for steering said vehicle.

12. The guidance apparatus in claim 11, where the navigation sensor is a GPS sensor, compass, paddle sensor, vision, RF, or other sensors to indicate the vehicle orientation or location.

13. The guidance apparatus in claim 11, where the computer means using a Kalman filter to integrate the boundary sensor with the navigation sensor.

14. A system for guiding a vehicle along a path defined by a first, relatively higher surface and a second, relatively lower surface, the system comprising:
   a) a plurality of non-contact distance measuring sensors aligned in essentially transverse to the normal direction of said vehicle travel so sense the vertical distance from the surfaces with distance sensors measuring a first, relatively higher surface, and distance sensors measuring a second, relatively lower surface; and
   b) a control means for producing control signals for said vehicle in response to said distance sensors showing a deviation from said path.

* * * * *